United States Patent
Eavenson, Sr. et al.

(10) Patent No.: US 9,884,662 B2
(45) Date of Patent: Feb. 6, 2018

(54) SUSPENSION AND LOCK-OUT SYSTEMS FOR A PARTIALLY TRACKED VEHICLE

(71) Applicant: MTD Products Inc, Valley City, OH (US)

(72) Inventors: Jimmy N. Eavenson, Sr., Aurora, OH (US); Peter Joseph Buchanan, Elyria, OH (US)

(73) Assignee: MTD PRODUCTS INC, Valley City, OH (US)

( * ) Notice: Subject to any disclaimer, the term of this patent is extended or adjusted under 35 U.S.C. 154(b) by 221 days.

(21) Appl. No.: 14/484,899

(22) Filed: Sep. 12, 2014

(65) Prior Publication Data

US 2015/0078871 A1 Mar. 19, 2015

Related U.S. Application Data

(60) Provisional application No. 61/877,556, filed on Sep. 13, 2013.

(51) Int. Cl.
*B62D 55/02* (2006.01)
*B62D 55/04* (2006.01)
*B62D 55/108* (2006.01)

(52) U.S. Cl.
CPC ............ *B62D 55/02* (2013.01); *B62D 55/04* (2013.01); *B62D 55/108* (2013.01)

(58) Field of Classification Search
CPC .. B62D 55/116; B62D 55/108; B62D 55/065; B62D 55/07; B62D 55/04; B62D 55/244; B62D 55/12; B62M 27/02
See application file for complete search history.

(56) References Cited

U.S. PATENT DOCUMENTS 2,719,062 A * 9/1955 Arps ...................... B60C 27/20
180/9.54
3,435,908 A * 4/1969 Sunderlin ............ B62D 53/062
172/811

(Continued)

FOREIGN PATENT DOCUMENTS

DE 1200144 9/1965
EP 0578504 1/1994

(Continued)

OTHER PUBLICATIONS

US 9,008,928, 04/2015, Oishi (withdrawn)

(Continued)

*Primary Examiner* — Joseph M Rocca
*Assistant Examiner* — Daniel S Yeagley
(74) *Attorney, Agent, or Firm* — Wegman, Hessler & Vanderburg

(57) ABSTRACT

A partially tracked utility vehicle and conversion are provided. The converted partially tracked utility vehicle has a chassis, front wheels, and a trailing link suspension. The trailing link suspension has a trailing link with a first end pivotably connected to the chassis and a second end pivotably connected to a walking beam at a walking beam pivot; a shock having a first end pivotably connected to a tension shaft and a second end pivotably connected to the trailing link; the walking beam further comprising a plurality of axle mounted bogey wheels for engaging a track of the partially tracked utility vehicle; a sprocket mounted to a traction drive of the utility vehicle for engaging and providing rotational power to the track; and an actuator attached to the chassis, the actuator having a shaft pivotably connected to the tension shaft and configured to rotate the tension shaft.

16 Claims, 24 Drawing Sheets

(56) References Cited

U.S. PATENT DOCUMENTS

| | | | |
|---|---|---|---|
| 3,664,449 A * | 5/1972 | Vardell | B62D 55/02 180/9.48 |
| 3,756,335 A | 9/1973 | Eisele | |
| 3,789,942 A * | 2/1974 | Kowalik | B62D 55/0655 180/9.44 |
| 3,826,388 A * | 7/1974 | Oldenburg | E02F 9/0841 180/9.44 |
| 3,860,079 A | 1/1975 | Hoffman | |
| 3,888,132 A | 6/1975 | Russ, Sr. | |
| 3,933,213 A | 1/1976 | Trowbridge | |
| 4,003,608 A | 1/1977 | Carter | |
| 4,043,417 A | 8/1977 | Orpana | |
| 4,202,564 A | 5/1980 | Strader | |
| 4,304,313 A * | 12/1981 | van der Lely | B62D 11/18 180/15 |
| 4,462,480 A * | 7/1984 | Yasui | B62B 17/04 180/193 |
| 4,566,553 A | 1/1986 | McCutcheon | |
| 4,618,015 A | 10/1986 | Yochum | |
| 4,683,970 A | 8/1987 | Smith | |
| 4,706,769 A | 11/1987 | Latourelle et al. | |
| 5,258,912 A | 11/1993 | Ghoneim | |
| 5,273,126 A | 12/1993 | Reed et al. | |
| 5,316,381 A * | 5/1994 | Isaacson | B62D 55/305 305/145 |
| 5,318,141 A | 6/1994 | Hansen | |
| 5,323,866 A | 6/1994 | Simard | |
| 5,393,134 A | 2/1995 | Oertley | |
| 5,409,305 A | 4/1995 | Nagorcka | |
| 5,575,347 A | 11/1996 | Uchibaba | |
| 5,791,429 A * | 8/1998 | Bergman | B62M 27/02 180/190 |
| 5,899,541 A | 5/1999 | Ying | |
| 5,938,301 A | 8/1999 | Hostetler et al. | |
| 5,975,226 A | 11/1999 | Matsumoto et al. | |
| 5,988,775 A | 11/1999 | Nordberg | |
| 6,000,766 A | 12/1999 | Takeuchi et al. | |
| 6,006,847 A | 12/1999 | Knight | |
| 6,074,025 A | 6/2000 | Juncker | |
| 6,123,399 A | 9/2000 | Snyder | |
| 6,199,646 B1 * | 3/2001 | Tani | B62D 55/04 180/9.21 |
| 6,253,867 B1 | 7/2001 | Lilbacka | |
| 6,289,995 B1 | 9/2001 | Fuller | |
| 6,450,280 B1 * | 9/2002 | Pepka | B62M 27/02 180/184 |
| 6,485,115 B1 | 11/2002 | Egle | |
| 6,595,603 B2 | 7/2003 | Rutz et al. | |
| 6,615,939 B1 | 9/2003 | Karales et al. | |
| 6,733,093 B2 | 5/2004 | Deland et al. | |
| 6,807,466 B2 | 10/2004 | Strothmann | |
| 6,904,993 B1 | 6/2005 | Rinck | |
| 6,926,108 B1 * | 8/2005 | Polakowski | B62M 27/02 180/190 |
| 6,962,219 B2 | 11/2005 | Hauser | |
| 7,017,688 B2 | 3/2006 | Bowers et al. | |
| 7,308,958 B2 | 12/2007 | Tamor | |
| 7,328,760 B2 | 2/2008 | Inaoka et al. | |
| 7,416,266 B2 | 8/2008 | Soucy et al. | |
| 7,464,785 B2 | 12/2008 | Spark | |
| 7,478,688 B2 | 1/2009 | Ki | |
| 7,520,348 B2 | 4/2009 | Bergsten | |
| 7,575,289 B2 | 8/2009 | Sugihara | |
| 7,673,711 B1 | 3/2010 | Berg | |
| 7,677,344 B2 | 3/2010 | Medina et al. | |
| 7,784,884 B2 | 8/2010 | Soucy | |
| 7,914,022 B2 | 3/2011 | Ruebusch | |
| 7,992,659 B2 | 8/2011 | Schaedler | |
| 8,011,458 B2 | 9/2011 | Hauser | |
| 8,104,846 B2 | 1/2012 | Porubcansky et al. | |
| 8,152,248 B2 | 4/2012 | Brazier | |
| 8,430,188 B2 * | 4/2013 | Hansen | B62D 55/04 180/9.26 |
| 8,474,841 B2 | 7/2013 | Ruebusch | |
| 8,573,348 B2 | 11/2013 | Cantemir | |
| 8,579,065 B2 | 11/2013 | Bergsten | |
| 8,630,770 B2 | 1/2014 | Matsumoto | |
| 8,701,801 B2 | 4/2014 | Itou | |
| 8,746,815 B2 | 6/2014 | Reshad | |
| 8,783,390 B2 | 7/2014 | Maeda | |
| 8,855,861 B2 | 10/2014 | Goebel | |
| 9,008,915 B2 | 4/2015 | Kang et al. | |
| 9,566,858 B2 | 2/2017 | Hicke | |
| 9,586,634 B2 | 3/2017 | Buchanan | |
| 2003/0180370 A1 | 9/2003 | Lesniak | |
| 2004/0099451 A1 * | 5/2004 | Nagorcka | B62D 55/0842 180/9.5 |
| 2004/0244349 A1 | 12/2004 | Meier | |
| 2005/0035655 A1 | 2/2005 | Beckstrom | |
| 2005/0077984 A1 | 4/2005 | Lee | |
| 2005/0248214 A1 | 11/2005 | Sugihara et al. | |
| 2009/0278403 A1 | 11/2009 | Canossa | |
| 2009/0308669 A1 * | 12/2009 | Vos | B62D 55/065 180/9.23 |
| 2010/0060075 A1 | 3/2010 | Hansen | |
| 2010/0139994 A1 | 6/2010 | Hansen | |
| 2012/0161511 A1 | 6/2012 | Brazier | |
| 2012/0242142 A1 | 9/2012 | Kautsch | |
| 2013/0192905 A1 * | 8/2013 | Janzen | B62D 55/116 180/6.7 |
| 2014/0175865 A1 | 6/2014 | Korus | |
| 2014/0288763 A1 | 9/2014 | Bennett | |
| 2014/0305715 A1 | 10/2014 | Makino | |

FOREIGN PATENT DOCUMENTS

| | | |
|---|---|---|
| JP | 07205852 | 8/1995 |
| JP | 10-129544 | 5/1998 |
| JP | 3937643 | 6/2007 |
| WO | 93/11022 A1 | 6/1993 |
| WO | 2014008378 | 1/2014 |

OTHER PUBLICATIONS

International Search Report and Written Opinion dated Oct. 7, 2013 for corresponding patent application No. PCT/US2013/049289.

International Search Report and Written Opinion dated Oct. 11, 2013 for corresponding patent application No. PCT/US2013/049278.

International Search Report and Written Opinion dated Nov. 5, 2015 for PCT/US2015/046266 filed Aug. 21, 2015.

International Search Report and Written Opinion for corresponding International Application No. PCT/US2014/055424 dated Dec. 5, 2014.

Office Action of Related Chinese Patent Application No. 201480050347.5, dated Apr. 1, 2017, pp. 1-11.

Office Action dated Sept. 27, 2017 for related U.S. Appl. No. 15/168,945; (pp. 1-9).

* cited by examiner

SUSPENSION AND LOCK-OUT SYSTEMS FOR A PARTIALLY TRACKED VEHICLE

CROSS-REFERENCE TO RELATED APPLICATIONS

This application claims benefit of U.S. Provisional Patent Application Ser. No. 61/877,556, filed Sep. 13, 2013, and entitled "SUSPENSION AND LOCK-OUT SYSTEMS FOR A PARTIALLY TRACKED VEHICLE", which is herein incorporated by reference in its entirety.

FIELD OF THE INVENTION

The present invention is directed to a garden or lawn utility vehicle, and more particularly, to a suspension system for a garden or lawn utility vehicle having a partially tracked propulsion system.

BACKGROUND OF THE INVENTION

A tracked vehicle's weight is transferred to the bottom length of track by a number of road wheels, or sets of bogie wheels. Road wheels are frequently mounted on some form of suspension to cushion the ride over rough ground. Suspension design in military vehicles is a major area of development, and the very early designs were often completely un-sprung. Later-developed road wheel suspension offered only a few inches of travel using springs, whereas modern hydro-pneumatic systems can provide several feet of travel and typically incorporate shock absorbers. Torsion-bar suspension is probably the most common type of military vehicle suspension. Construction vehicles have smaller road wheels that are designed primarily to prevent track derailment, and they are normally contained within a single bogie that integrates the idler wheel and sometimes the drive sprocket.

Track drive suspensions are inherently faced with performance issues which include limited travel/effective suspension, track derailment, and restricted/limited utilization of attachments. These limitations have a direct effect on machine directional/steering control, ride quality, flexibility/functionality with attachments, stability and travel speed.

Transfer of power to the tracks is accomplished by drive wheels (friction), or drive sprockets, that are powered by transmissions or motors that engage holes or lugs in the track links that drive the track. In military vehicles, the drive wheel is typically mounted well above the contact area on the ground, allowing it to be fixed in position. In agricultural and construction tracked vehicles, the drive wheel is normally incorporated as part of the bogie. Placing suspension on the drive sprocket is possible, but is mechanically more complicated. A non-powered wheel, an idler, is placed at the opposite end of the track, primarily to tension the track—loose track could be easily thrown (slipped) off the wheels. To prevent throwing, the inner surfaces of the tracks usually have vertical guide lugs engaging gaps between the bogie and idler/sprocket wheels. In military vehicles with a rear sprocket, the idler wheel is placed higher than the road wheels to allow it to climb over obstacles. Some track arrangements use return rollers to keep the top of the track running straight between the drive sprocket and idler. Others, called slack track, allow the track to droop and run along the tops of large bogie (sometimes called road) wheels. This was a feature of the Christie suspension, leading to occasional misidentification of other slack track-equipped vehicles. Many WW II German military vehicles, including all half-track and all later tank designs (after the Panzer IV), had slack-track systems, usually driven by front-located drive sprockets, running along the tops of the often overlapping, and sometimes interleaved, large diameter doubled road wheels (on the Tiger I and Panther, in their suspension systems). The choice of overlapping/interleaved road wheels allowed the use of slightly more torsion bar suspension members, allowing any German tracked military vehicle with such a setup to have a noticeably smoother ride over challenging terrain, but at the expense of mud and ice collecting between the overlapping areas of the road wheels, and freezing solid in cold weather conditions, often immobilizing the vehicle so equipped.

It takes considerable power to steer a tracked vehicle. As the vehicle turns, the leading and trailing ends of the footprint, or contact patch, skid sideways, perpendicular to the direction the tracks roll. Hence the name "skid steering" could be applied.

In FIG. 1, the arrows indicate the direction in which the contact patch will move during a right (clockwise) neutral axis (Zero) turn. A neutral axis (Zero) turn is a turn about a center point through the machine or the powered drive axle. The further toward the ends, the more the track will move in a direction other than the direction in which it would normally move for forward propulsion.

FIG. 2 shows the magnitude of the frictional forces that must be overcome in order to make the vehicle turn about its vertical axis. These are simply the horizontal component of the direction that each point of the contact patch will move as the vehicle rotates. The friction at any point is proportional to the distance forward of the vertical axis. From this it follows that the total force required is proportional to the length of the contact patch, the weight of the vehicle, and the inverse of the radius of the turn.

The worst-case scenario for overcoming friction is the pivot turn. A pivot turn is a turn about a center point through the center of a "stationary" traction track. In a pivot turn, in which one track travels in a direction while the other track stays stationary, which results in the vehicle rotating about a center point through the center of a "stationary" traction track.

Further, turns executed while both tracks are traveling generally require less power, as less energy is required to overcome the static friction associated with a travelling track, as opposed to a static track. Also, apart from the pivot turn, when compared to the zero turn, turns of greater radii will require less power, as the energy required to overcome the static friction (or terrain abrasion) is spread out over a longer period of time.

Therefore, a need exists for an improved suspension system for tracked vehicles.

BRIEF SUMMARY OF THE INVENTION

In one aspect of the invention, a trailing link suspension for a tracked utility vehicle having a chassis comprises: a forward trailing link having a first end pivotably connected to the chassis and a second end pivotably connected to a forward walking beam at a walking beam pivot; a forward shock having a first end pivotably connected to the chassis and a second end pivotably connected to the forward trailing link; a rear trailing link having a first end pivotably connected to the chassis and a second end pivotably connected to a rear walking beam at a walking beam pivot; a rear shock having a first end pivotably connected to the chassis and a second end pivotably connected to the rear trailing link; an intermediate trailing link located between the forward tailing link and the rear trailing link; the intermediate trailing link having a first end pivotably connected to the chassis and a second end pivotably connected to an intermediate walking beam at a waling beam pivot; the walking beams having a plurality of axle mounted bogey wheels for engaging a track of the tracked utility vehicle.

In another aspect of the invention, at least one of the trailing links further comprises a lock-out. In another aspect of the invention, the lock-out is a pneumatic lock-out comprised of the shock. In another aspect of the invention, the lock-out is a mechanical lock-out comprised of a mechanical lock-out member. In another aspect of the invention, the lock-out member further comprises a first end pivotably connected to the chassis and a second end selectively connected to the trailing link.

In another aspect of the invention, at least one of the walking beam members has a pan-hard rod comprised of a rigid rod having a first end and a second end; the first end is pivotably connected to the walking beam member and the second end is pivotably connected to the chassis opposite the walking beam.

In another aspect of the invention, the walking beam pivot of at least one walking beam is biased toward a front or a rear of the tracked utility vehicle. In another aspect of the invention, the walking beam pivot of the front walking beam is biased toward the front of the tracked utility vehicle, and the walking beam pivot of the rear walking beam is biased toward the rear of the tracked utility vehicle. In another aspect of the invention, the walking beam pivot of the front walking beam is biased toward the front of the tracked utility vehicle, and the walking beam pivot of the rear walking beam is biased toward the front of the tracked utility vehicle. In another aspect of the invention, the walking beam pivot of the front walking beam is biased toward the rear of the tracked utility vehicle, and the walking beam pivot of the rear walking beam is biased toward the rear of the tracked utility vehicle.

In another aspect of the invention, at least of the walking beams has a roll pivot, thereby permitting all of the bogey wheels of the walking beam to maintain contact with the track on uneven terrain. In another aspect of the invention, the roll pivot is located below the walking beam pivot and the axles of the walking beam.

In another aspect of the invention, the walking beam is further comprised of a forward section, a middle section, and a rear section; the forward section and the middle section are pivotably connected with a first roll pivot; the rear section and the middle section are pivotably connected with a second roll pivot; the walking beam pivot is situated in the middle section; the forward section and the rear section each have bogey wheels mounted on axles that engage at least one of the track, or a track lug or guide. In another aspect of the invention, the forward section and the rear section pivot independently. In another aspect of the invention, the first and second roll pivot movement is limited to about +/−10 degrees.

In another aspect of the invention, the trailing link is comprised of at least one swing arm.

In another aspect of the invention, the trailing link is comprised of a first swing arm and a second swing arm connected with an upper cross brace and a lower cross brace.

In another aspect of the invention, the shocks are comprised of at least one of coil, leaf or torsion springs; wherein the shocks are mechanical, hydraulic, and/or pneumatic.

In another aspect of the invention, the shocks are independently adjustable so that more of the tracked utility vehicle's weight is supported as a midpoint of the suspension.

In yet another aspect of the invention, a trailing link suspension for a tracked utility vehicle having a chassis is comprised of at least two trailing links, each of the trailing links having a shock and a walking beam; a first end of the trailing link is pivotably connected to the chassis and a second end of the trailing link is pivotably connected to the walking beam; the shock has a first end pivotably connected to the chassis and a second end pivotably connected to the trailing link; the walking beams having a plurality of axle mounted bogey wheels for engaging one or both of a track of the tracked utility vehicle or a track lug or guide of the track; wherein the shocks are independently adjustable to permit more of the tracked utility vehicle's weight to be supported at a midpoint of the suspension.

In yet another aspect of the invention, a partially tracked utility vehicle having a chassis is comprised of front wheels and a trailing link suspension. The trailing link suspension is comprised of: a trailing link having a first end pivotably connected to the chassis and a second end pivotably connected to a walking beam at a walking beam pivot; a shock having a first end pivotably connected to a tension shaft and a second end pivotably connected to the trailing link; the walking beam further comprising a plurality of axle mounted bogey wheels for engaging a track of the partially tracked utility vehicle; a sprocket mounted to a traction drive of the utility vehicle for engaging and providing rotational power to the track; an actuator attached to the chassis, the actuator having a shaft pivotably connected to the tension shaft and configured to rotate the tension shaft.

In another aspect of the invention, the partially tracked vehicle further comprises front wheels having a steerable axle.

In another aspect of the invention, the steerable axle of the partially tracked vehicle is synchronized with the traction drive of the track to emulate Ackerman Steering geometry.

In another aspect of the invention, the rotation of the tension shaft increases or decreases the tension of the tracks.

In another aspect of the invention, rotation of the tension shaft increases or decreases the height of the partially tracked vehicle.

In another aspect of the invention, the partially tracked vehicle shock can be configured to act as a lock-out member.

In another aspect of the invention, the walking beam pivot of the walking beam is biased toward a front or a rear of the partially tracked utility vehicle.

In another aspect of the invention, the shock is comprised of at least one of coil, leaf or torsion springs.

In another aspect of the invention, the shocks are mechanical, hydraulic, and/or pneumatic.

In another aspect of the invention, the partially tracked vehicle further comprises an attachment boom assembly having an boom and an attachment interface, the attachment boom assembly being pivotably attached to the chassis.

In another aspect of the invention, the boom has a first end and a second end, the boom first end is pivotably attached to the chassis and the boom second end is pivotably attached to an attachment interface.

In another aspect of the invention, the attachment boom assembly further comprises at least one of a lift cylinder or a pitch cylinder. The lift cylinder being pivotably mounted between the chassis and the boom, and the pitch cylinder being pivotably mounted between the boom and the attachment interface.

In yet another aspect of the invention, a utility vehicle conversion is provided. The utility vehicle conversion includes tracks for a traction drive of a utility vehicle having a chassis. The utility vehicle conversion further comprises a trailing link having a first end pivotably connectable to the chassis and a second end pivotably connectable to a walking beam at a walking beam pivot; a shock having a first end pivotably connectable to a tension shaft and a second end pivotably connectable to the trailing link; the walking beam further comprising a plurality of axle mounted bogey wheels for engaging a track; and a sprocket mountable to a traction drive of the utility vehicle for engaging and providing rotational power to the track.

In another aspect of the utility vehicle conversion, the utility vehicle conversion further comprises an actuator attachable to the chassis, the actuator having a shaft pivotably connected to the tension shaft and configured to rotate the tension shaft.

In another aspect of the utility vehicle conversion, the utility vehicle further comprises front wheels having a steerable axle. Further, the traction drive of the track is synchronizable with the steerable axle to emulate Ackerman Steering geometry.

In another aspect of the utility vehicle conversion, the rotation of the tension shaft increases or decreases the tension of the tracks.

In another aspect of the utility vehicle conversion, wherein the rotation of the tension shaft increases or decreases the height of the utility vehicle.

In another aspect of the utility vehicle conversion, the shock is configurable to act as a lock-out member.

In another aspect of the utility vehicle conversion, the walking beam pivot of the walking beam is biased toward a front or a rear of the utility vehicle.

In another aspect of the utility vehicle conversion, the shock is comprised of at least one of coil, leaf or torsion springs.

In another aspect of the utility vehicle conversion, the shocks are mechanical, hydraulic, and/or pneumatic.

In another aspect of the utility vehicle conversion, the utility vehicle conversion further comprising an attachment boom assembly having an boom and an attachment interface, the attachment boom assembly being pivotably attachable to the chassis.

In another aspect of the utility vehicle conversion, the boom has a first end and a second end, the boom first end is pivotably attachable to the chassis and the boom second end is pivotably attachable to an attachment interface pivotably attached.

In another aspect of the utility vehicle conversion, the attachment boom assembly further comprises at least one of a lift cylinder or a pitch cylinder; the lift cylinder being pivotably mountable between the chassis and the boom, the pitch cylinder being pivotably mountable between the boom and the attachment interface.

In yet another aspect of the invention, a utility vehicle conversion for providing tracks for a right traction drive and a left traction drive of a utility vehicle having a chassis is disclosed. The utility vehicle conversion comprises: a right trailing link having a first end pivotably connectable to a right side of the chassis and a second end pivotably connectable to a right walking beam at a walking beam pivot; a right shock having a first end pivotably connectable to a tension shaft and a second end pivotably connectable to the right trailing link; the right walking beam further comprising a plurality of axle mounted bogey wheels for engaging a right track; a right sprocket mountable to a right traction drive mounted to the right side of the chassis for engaging and providing rotational power to the track; a left trailing link having a first end pivotably connectable to a left side of the chassis and a second end pivotably connectable to a left walking beam at a walking beam pivot; a left shock having a first end pivotably connectable to a tension shaft and a second end pivotably connectable to the left trailing link; the left walking beam further comprising a plurality of axle mounted bogey wheels for engaging a left track; and a left sprocket mountable to a left traction drive mounted to the left side of the chassis for engaging and providing rotational power to the track.

In another aspect of the utility vehicle conversion, the conversion is comprised of an actuator attachable to the chassis, the actuator having a shaft pivotably connected to the tension shaft and configured to rotate the tension shaft.

In another aspect of the utility vehicle conversion, the utility vehicle further comprises front wheels having a steerable axle.

In another aspect of the utility vehicle conversion, the right and left traction drives of the right and left tracks are synchronizable with the steerable axle to emulate Ackerman Steering geometry.

In another aspect of the utility vehicle conversion, the rotation of the tension shaft increases or decreases the tension of the tracks.

In another aspect of the utility vehicle conversion, the rotation of the tension shaft increases or decreases the height of the utility vehicle.

In another aspect of the utility vehicle conversion, at least one of the right shock or left shock is configurable to act as a lock-out member.

In another aspect of the utility vehicle conversion, the walking beam pivot of at least one of the right walking beam or left walking beam is biased toward a front or a rear of the utility vehicle.

In another aspect of the utility vehicle conversion, each of the right shock and the left shock is comprised of at least one of coil, leaf or torsion springs.

In another aspect of the utility vehicle conversion, wherein the right shock is mechanical, hydraulic, and/or pneumatic.

In another aspect of the utility vehicle conversion, wherein the left shock is mechanical, hydraulic, and/or pneumatic.

In another aspect of the utility vehicle conversion, the utility vehicle conversion further comprises an attachment boom assembly having an boom and an attachment interface, the attachment boom assembly being pivotably attachable to the chassis.

In another aspect of the utility vehicle conversion, the boom has a first end and a second end, the boom first end is pivotably attachable to the chassis and the boom second end is pivotably attachable to an attachment interface pivotably attached.

In another aspect of the utility vehicle conversion, wherein the attachment boom assembly is further comprised of at least one of a lift cylinder or a pitch cylinder, the lift cylinder being pivotably mountable between the chassis and the boom, and the pitch cylinder being pivotably mountable between the boom and the attachment interface.

In yet another aspect of the invention, a method of converting a utility vehicle to a partially tracked utility vehicle is provided. The method comprising: providing a utility vehicle having a rear drive wheel mounted on a traction drive and front wheels mounted on a chassis, a trailing link, a shock, a walking beam, a drive sprocket, and a track; removing the rear drive wheel from said traction drive; pivotably connecting a first end of the trailing link to the chassis and pivotably mounting a second end of the trailing link to the walking beam at a walking beam pivot, wherein the walking beam further comprising a plurality of axle mounted bogey wheels for engaging the track; pivotably connecting the first end of the shock to a tension shaft pivotably connected to the chassis, pivotably connecting the second end of the shock to the trailing link; mounting the drive sprocket to the traction drive; and placing the track around the drive sprocket and the walking beam, wherein the drive sprocket engages and provides rotational power to the track.

In another aspect of the method, the providing step further includes providing the an actuator; wherein the method further comprises mounting the actuator to the chassis and pivotably connecting a shaft of the actuator to the tension shaft, such that the actuator is configured to rotate the tension shaft.

In another aspect of the method, the providing step further comprises providing the tension shaft, wherein the tension shaft is pivotably connected to the chassis following the providing step.

In another aspect of the method, the front wheels have a steerable axle.

In another aspect of the method, Ackerman steering geometry is emulated by synchronizing the traction drive of the track with the steerable axle.

In another aspect of the method, the traction drive of the track is synchronized with the steerable axle, thereby emulating Ackerman steering geometry.

In another aspect of the method, the tension shaft is rotated to increase or decrease the tension of the track.

In another aspect of the method, the tension shaft is rotated to increase or decrease the height of utility vehicle chassis.

In another aspect of the method, the shock is configurable as a lock-out member.

In another aspect of the method, the walking beam pivot of the walking beam is biased toward a front or a rear of the utility vehicle.

In another aspect of the method, the shock is comprised of at least one of coil, leaf or torsion springs.

In another aspect of the method, the shock is mechanical, hydraulic, and/or pneumatic.

In another aspect of the method, the providing step is further comprised of providing an attachment boom assembly having an boom and an attachment interface, and pivotably attaching the attachment boom assembly to the chassis.

In another aspect of the method, the boom has a first end and a second end, wherein the boom first end is pivotably attached to the chassis and the boom second end is pivotably attached to an attachment interface.

In another aspect of the method, the attachment boom assembly is further comprised of at least one of a lift cylinder or a pitch cylinder.

In another aspect of the method, the lift cylinder is pivotably mounted between the chassis and the boom.

In another aspect of the method, the pitch cylinder being pivotably mounted between the boom and the attachment interface.

In another aspect of the method, a mower deck is removed from an underside of the chassis after the providing step.

In yet another aspect of the invention, a method of converting a utility vehicle to a partially tracked utility vehicle is provided. The method comprises: providing a utility vehicle having front wheels and a right traction drive with a right rear drive wheel mounted on a right side of a chassis and a left traction drive with a left rear drive wheel mounted on a left side of the chassis, a right trailing link, a right shock, a right walking beam, a right drive sprocket, a right track, a left trailing link, a left shock, a left walking beam, a left drive sprocket, and a left track; removing the right rear drive wheel from the right traction drive and the left rear drive wheel from the left traction drive; pivotably connecting a first end of the right trailing link to the right side of the chassis and pivotably mounting a second end of the right trailing link to the right walking beam at a walking beam pivot, wherein the right walking beam further comprising a plurality of axle mounted bogey wheels for engaging the right track; pivotably connecting a first end of the left trailing link to the left side of the chassis and pivotably mounting a second end of the left trailing link to the left walking beam at a walking beam pivot, wherein the left walking beam further comprising a plurality of axle mounted bogey wheels for engaging the left track; pivotably connecting the first end of the right shock to a tension shaft pivotably connected to the right side of the chassis, pivotably connecting the second end of the right shock to the right trailing link; pivotably connecting the first end of the left shock to a tension shaft pivotably connected to the left side of the chassis, pivotably connecting the second end of the left shock to the left trailing link; mounting the right drive sprocket to the right traction drive; mounting the left drive sprocket to the left traction drive; placing the right track around the right drive sprocket and the right walking beam, wherein the right drive sprocket engages and provides rotational power to the right track; and placing the left track around the left drive sprocket and the left walking beam, wherein the left drive sprocket engages and provides rotational power to the left track.

In another aspect of the method, the providing step further includes providing the an actuator; wherein the method further comprises mounting the actuator to the chassis and pivotably connecting a shaft of the actuator to the tension shaft, such that the actuator is configured to rotate the tension shaft.

In another aspect of the method, the providing step further comprises providing the tension shaft, wherein the tension shaft is pivotably connected to the chassis following the providing step.

In another aspect of the method, the front wheels have a steerable axle.

In another aspect of the method, Ackerman steering geometry is emulated by synchronizing the traction drive of the track with the steerable axle.

In another aspect of the method, the traction drive of the track is synchronized with the steerable axle, thereby emulating Ackerman steering geometry.

In another aspect of the method, the tension shaft is rotated to increase or decrease the tension of the tracks.

In another aspect of the method, the tension shaft is rotated to increase or decrease the height of utility vehicle chassis.

In another aspect of the method, the shock is configurable as a lock-out member.

In another aspect of the method, the walking beam pivot of the walking beam is biased toward a front or a rear of the utility vehicle.

In another aspect of the method, each of the shocks is comprised of at least one of coil, leaf or torsion springs.

In another aspect of the method, wherein each of the shocks are mechanical, hydraulic, and/or pneumatic.

In another aspect of the method, the providing step is further comprised of providing an attachment boom assembly having an boom and an attachment interface, and pivotably attaching the attachment boom assembly to the chassis.

In another aspect of the method, the boom has a first end and a second end, wherein the boom first end is pivotably attached to the chassis and the boom second end is pivotably attached to an attachment interface.

In another aspect of the method, the attachment boom assembly is further comprised of at least one of a lift cylinder or a pitch cylinder; wherein the lift cylinder is pivotably mounted between the chassis and the boom, the pitch cylinder being pivotably mounted between the boom and the attachment interface.

In another aspect of the method, wherein a mower deck is removed from an underside of the chassis after the providing step.

In yet another aspect of the invention, the utility vehicle is a utility machine, including, but not limited to a zero turn mower or a zero turn tractor.

Advantages of the present invention will become more apparent to those skilled in the art from the following description of the embodiments of the invention which have been shown and described by way of illustration. As will be realized, the invention is capable of other and different embodiments, and its details are capable of modification in various respects.

BRIEF DESCRIPTION OF SEVERAL VIEWS OF THE DRAWINGS

These and other features of the present invention, and their advantages, are illustrated specifically in embodiments of the invention now to be described, by way of example, with reference to the accompanying diagrammatic drawings, in which.

Figure 2:
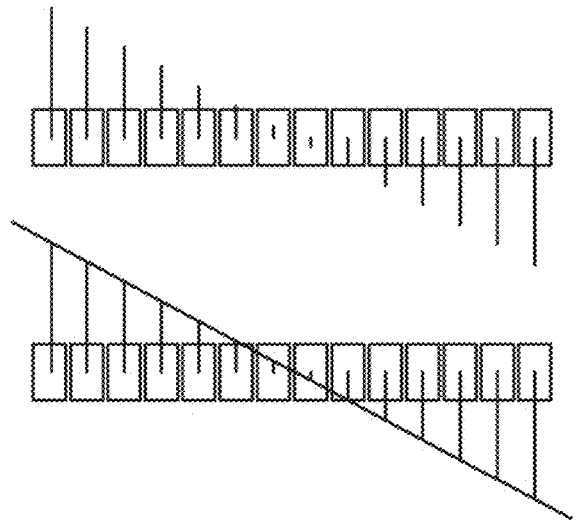
FIG. 2 is a force-magnitude diagram for a tracked utility vehicle executing a neutral axis (Zero) turn.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION OF THE PREFERRED EMBODIMENT

Approximating language, as used herein throughout the specification and claims, may be applied to modify any quantitative representation that could permissibly vary without resulting in a change in the basic function to which it is related. Accordingly, a value modified by a term or terms, such as "about", is not limited to the precise value specified. In at least some instances, the approximating language may correspond to the precision of an instrument for measuring the value. Range limitations may be combined and/or interchanged, and such ranges are identified and include all the sub-ranges stated herein unless context or language indicates otherwise. Other than in the operating examples or where otherwise indicated, all numbers or expressions referring to quantities of ingredients, reaction conditions and the like, used in the specification and the claims, are to be understood as modified in all instances by the term "about".

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

As used herein, the terms "comprises", "comprising", "includes", "including", "has", "having", or any other variation thereof, are intended to cover a non-exclusive inclusion. For example, a process, method, article or apparatus that comprises a list of elements is not necessarily limited to only those elements, but may include other elements not expressly listed or inherent to such process, method, article, or apparatus.

The singular forms "a", "an", and "the" include plural referents unless the context clearly dictates otherwise.

Figure 3:
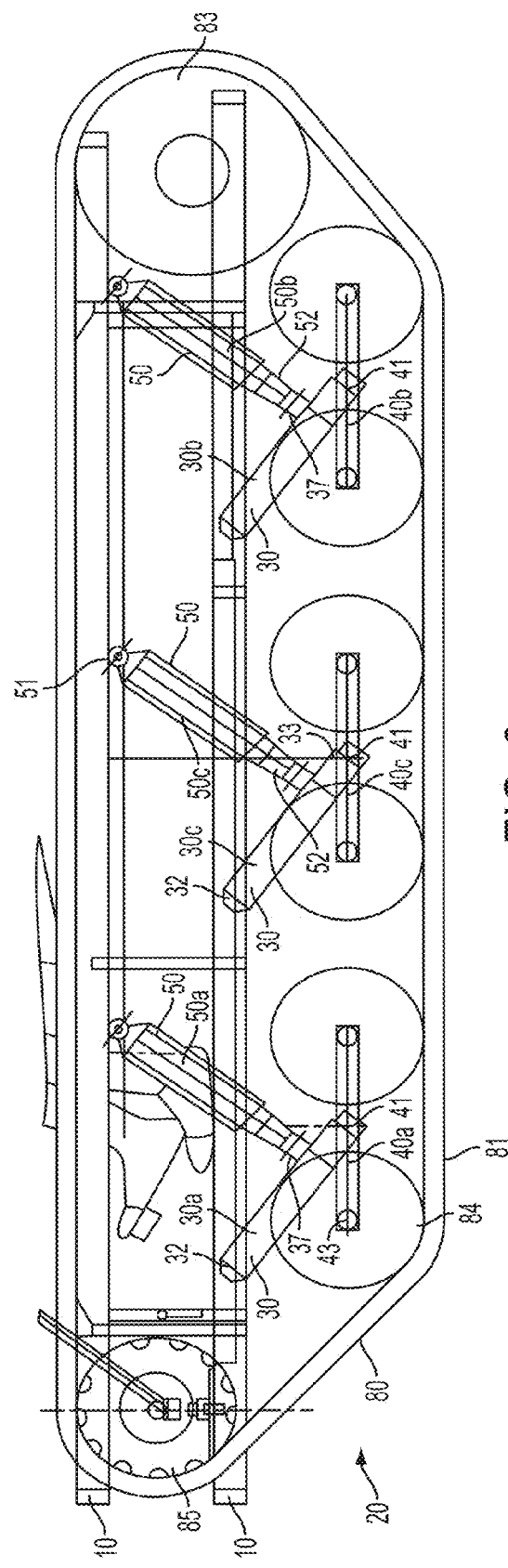
FIG. 3 is an exemplary embodiment of a suspension system for a tracked vehicle.
Figure 4:
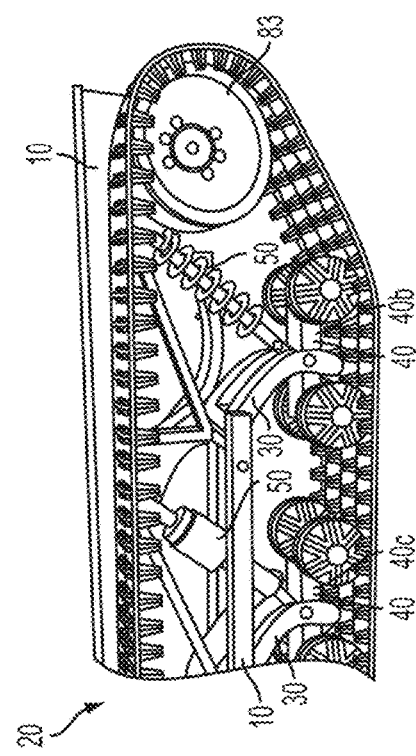
FIGS. 4-5 is an exemplary embodiment of a tracked utility vehicle suspension system with a walking beam pivot biased forward.
Figure 5:
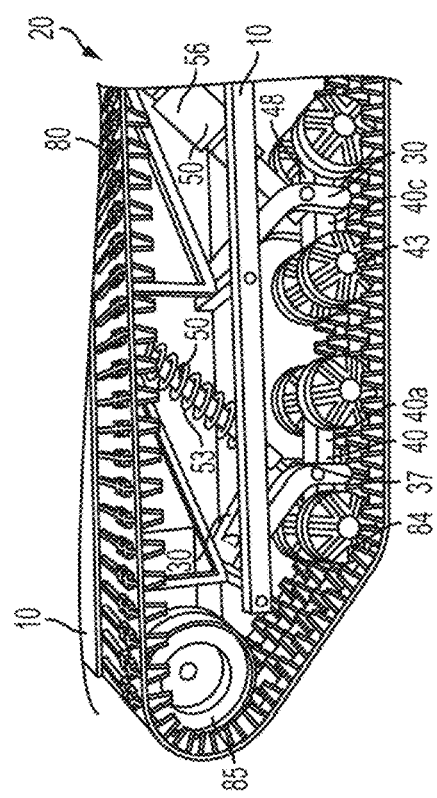

Turning to FIGS. 3-5, The Tracked Utility Vehicle's (TUV) weight is transferred from chassis 10 to the bottom length 81 of the tracks 80 (that portion contacting the terrain) by trailing link 30 and walking-beam 40 suspension elements incorporating sets of wheels called bogies 84. Six (6) trailing link 30 and walking-beam 40 elements are used for the suspension to transfer the TUV suspended weight through forty-eight (48) bogie wheels 84 onto the tracks 80 while cushioning the ride over uneven and rough terrain. FIG. 3, depicts side of TUV having one track 80. The other side of TUV has a second track that mirrors the track depicted in FIG. 3. In this embodiment, each track 80 of TUV has three (3) trailing link 30 and walking-beam 40 elements. Each walking beam element 40 has eight (8) bogie wheels.

Configurations are anticipated that incorporate more or less trailing links, walking beams, and bogie wheels, but in this example TUV suspension 20, six (6) trailing links, six (6) walking beams, and forty-eight (48) bogie wheels are depicted.

Transfer of power to the tracks 80 in FIG. 3 is accomplished by drive sprockets 85, that are powered by transmissions or motors that engage lugs and guides 86 in the track 80. A non-powered wheel, a tensioning idler 83, is placed at the opposite end of the track 80 from drive sprocket 85, primarily to tension the track—loose track could be easily thrown (slipped) off the wheels. As is depicted in FIG. 3-5, the trailing-link suspension is a design in which trailing links 30 are connected between (and perpendicular to and forward of) the walking beam 40 and the chassis 10. The trailing-link design uses just one trailing link 30 and an adjustable shock 50 to locate the walking-beams longitudinally and laterally. Each trailing link 30 has a first end 32 pivotably connected to chassis 10 and a second end 33 pivotably connected to walking beam 40 at walking beam pivot 41. Further, each trailing link 30 also has a shock flange 37 close to second end 33. Trailing links can have a single swing arm design, such as depicted in FIG. 3, or a multiple swing arm design, such as is depicted in FIGS. 4 and 5.

Further, in FIGS. 3-5, each shock 50 has a first end 51 and a second end 52. The first end 51 is pivotably connected to chassis 10 at a chassis shock flange 15. The second end 52 is pivotably connected to trailing link 30 at trailing link shock flange 37. The suspension rate of the shocks 50 are used to set the vehicle's ride-height (its location in the suspension stroke). Shocks 50 can have coil, leaf, or torsion springs. Further, shocks 50 can be hydraulic and/or pneumatic spring devices. The TUV has adjustable pre-load springs 53 to allow for suspension compensation during periods when additional temporary or permanent payload weight is used (that could otherwise affect ride-height or collapse the suspension). The shock 50 is configured so as to maintain bogie wheel 84 contact with the track 80. It is anticipated that the preload of shock 50 can be non-adjustable, mechanically adjustable, or air adjustable. Further, it is anticipated that the spring rate and dampening of shock 50 can be fixed and dictated pneumatically, or can be adjustable via an air spring 56. Spring rate and dampening for air shocks can be made by changing the amount of air in air spring 56 via air spring valve 54. To an extent, the drag created during turning maneuvers can be minimized by concentrating the weight on the middle of the contact patch (where the sliding movement is smallest) by increasing the spring rates and preload of the mid-section spring elements. Track tension is established and maintained via the adjustable spring rates of the roller or separate track tensioning idler 83. Accordingly, suspension 20 includes mechanical (coil, leaf, torsion, etc.) springs 50 and hydraulic or pneumatic spring devices 50 that are individually selected or adjusted so that the mid-sections of suspension 20 can support more of the TUV weight to reduce the lateral forces generated during turning maneuvers. The mid sections include intermediate walking beam(s) 40c, and associated shock 50c and trailing link 30c.

The walking beam suspension 20 depicted in FIGS. 3-5 is particularly useful in off-road applications incorporating tracks, since it offers great lateral stability, ride comfort, and only tend to raise load height minimally when small changes in the terrain are encountered. Walking beams 40 are assemblies with a pivot point 41, about which there are portions of the "beam" on each side. In this embodiment, a trailing link 30 is pivotably connected to each walking beam 40 at the walking beam pivot point 41.

Each end of the walking beam 40 incorporates an axle 43 assembly containing four (4) bogie wheels 84 which provides eight (8) bogie wheels per walking beam 40. Pivoting (pitching) of the walking beams 40 allow for track segment movements with bounce (jounce) and rebound forces being centralized and equalized (or proportioned) at the walking beam/trailing link pivot 41 generally with minimal reaction of trailing link 30, even during large pitch movements of the walking beam 40. In some embodiments, walking beams 40 may incorporate torsion or jounce elastomeric blocks to absorb shock and control pivot rotation (pitch).

As can be seen, FIG. 3 depicts the left side suspension 20 and chassis 10 of TUV. As is described above, the left side suspension 20 has one shock 50 per trailing link 30, namely forward shock 50a, rear shock 50b, and one or more intermediate shock(s) 50c located between forward shock 50a and rear shock 50b. Further, the left suspension has one trailing link 30 per walking beam 40, namely forward walking beam 20a, rear walking beam 20b, and one or more intermediate walking beam(s) 20c located between forward walking beam 20a and rear walking beam 20b. For the sake of brevity, it is understood that the right side suspension 20 and chassis 10 of TUV is a mirror image of the left side suspension 20 and chassis 10 described herein.

Figure 6:
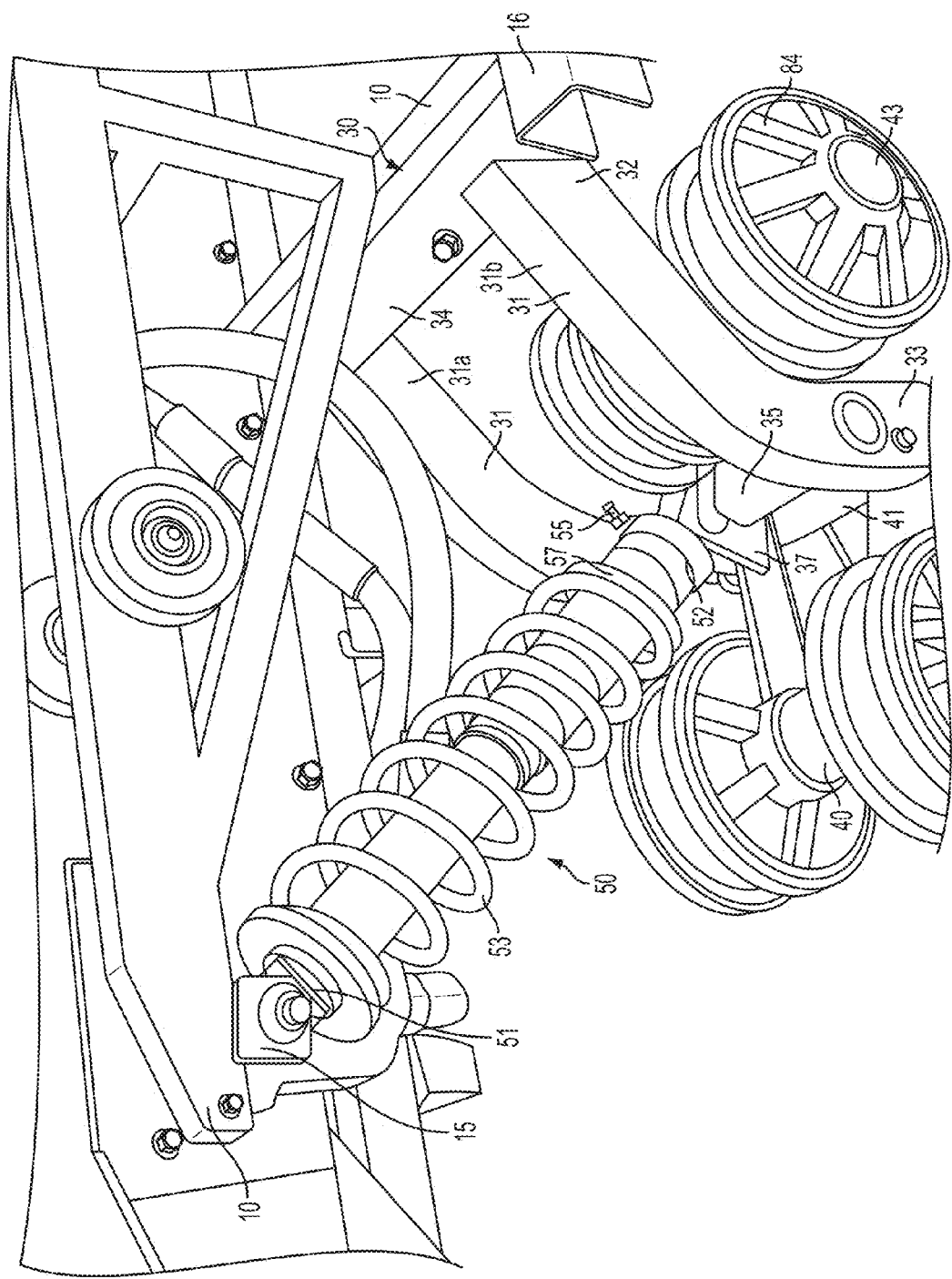
FIG. 6 depicts an exemplary embodiment of a trailing arm, walking beam, shock, and bogey wheels of a tracked vehicle suspension system.

FIG. 6 is a close up depiction of a shock 50, trailing link 30, and walking beam 40. Shock 50 has a first end 51 and a second end 52. The first end 51 is pivotably connected to chassis 10 at a chassis shock flange 15. The second end 52 is pivotably connected to trailing link 30 at trailing link shock flange 37. Preload of shock 50 is dictated by the load placed upon spring 53 by mechanical and air means. For hydraulic shocks, rough preload can be adjusted via pneumatic pressure through preload air valve 55 and an air pump, and finer preload adjustments can be made mechanically by adjusting the position of collar 57. For mechanical shocks, preload adjustments can be made mechanically by adjusting the position of collar 57. For air shocks, preload can be adjusted via pneumatic pressure through preload air valve 55 and an air pump.

Further, FIG. 6 depicts trailing link 30 having multiple curved swing arms 31. In this embodiment, trailing link 30 has a first swing arm 31a and a second swing arm 31b connected together via an upper cross brace 34 and a lower cross brace 35. The first end 32 of trailing link 30 is pivotably connected to chassis 10 at a chassis trailing link flange 16. The second end 33 of trailing link 30 is pivotably connected to walking beam 40 at walking beam pivot 41. Lower cross brace 35 has a shock flange 37 for connecting the second end 52 of shock 50 to trailing link 30. Walking beam 40 is pivotably connected to trailing link 30 at walking beam pivot 41. In the embodiment shown, walking beam has two axels 43, with each axel 43 having four bogey wheels

Figure 7:
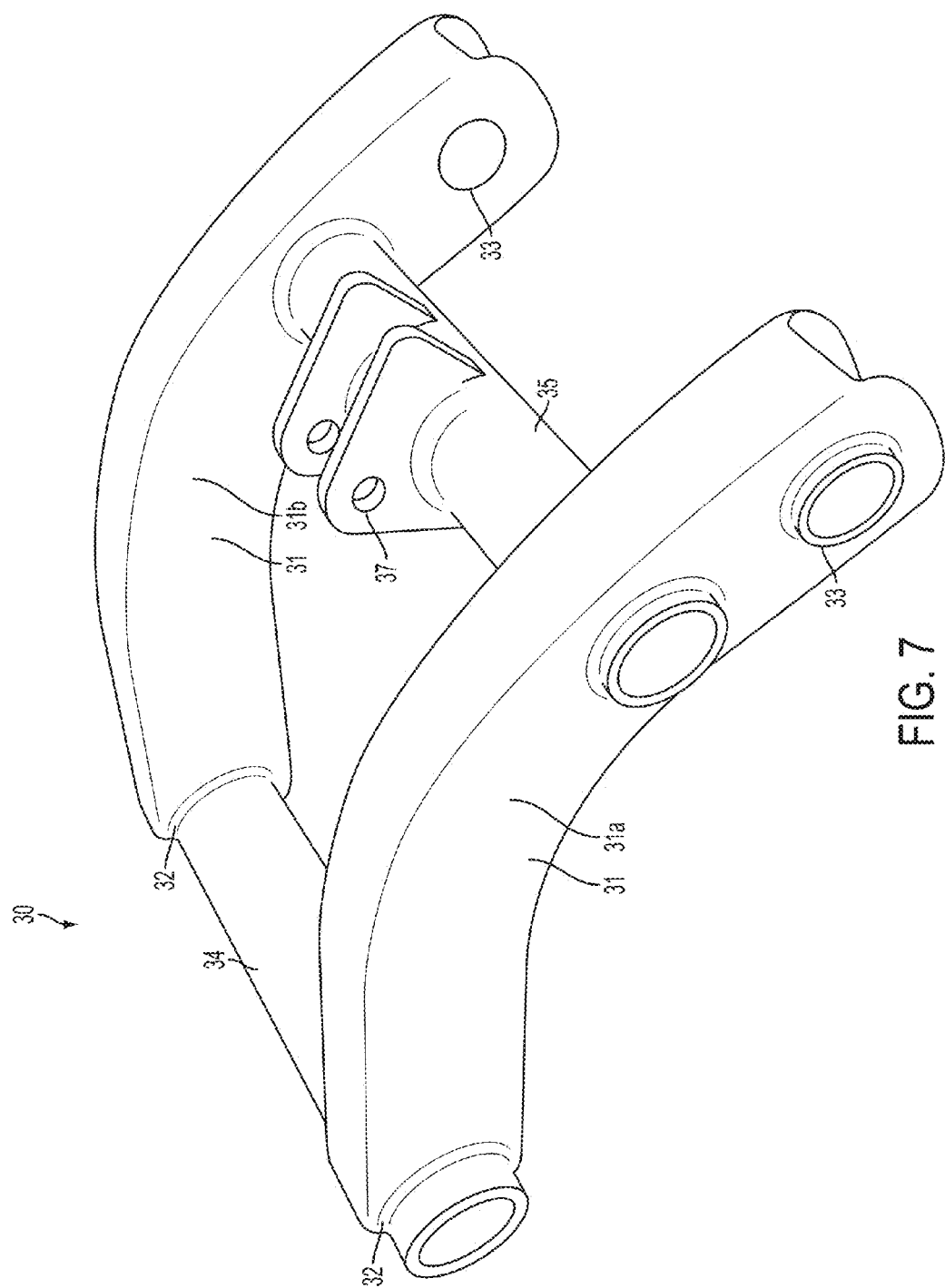
FIG. 7 depicts an exemplary embodiment of a trailing arm of a tracked vehicle suspension system.

84. FIG. 7 is a close-up depiction of trailing link 30 described above in conjunction with FIG. 6.

Turning back to FIGS. 3-6, biasing the walking beam pivot 41 of walking beam 40 toward one end or the other of walking beam 40 results in the suspension reaction that the walking beam 40 transfers to the trailing link 30 proportionally increasing in direct relationship to the decrease in distance between the bogie wheel axle 43 to the walking beam pivot 41; this effectively provides different suspension rates in different track segments. In FIG. 3, the walking beam pivot 41 of the walking beams 40 are not biased. In FIGS. 4-5, the walking beam pivot 41 of the most forward walking beam 40a and rear walking beam 40b are both biased toward the front of the TUV, and intermediate walking beam 40c is neutral, which shifts the contact patch towards the front of TUV. In another embodiment, it is contemplated that the walking beam pivot 41 of the most forward walking beam 40a and rear walking beam 40b are both biased toward their respective ends, and this maximizes the effective bottom length of track (increases floatation and reduces ground pressure).

Figure 8:
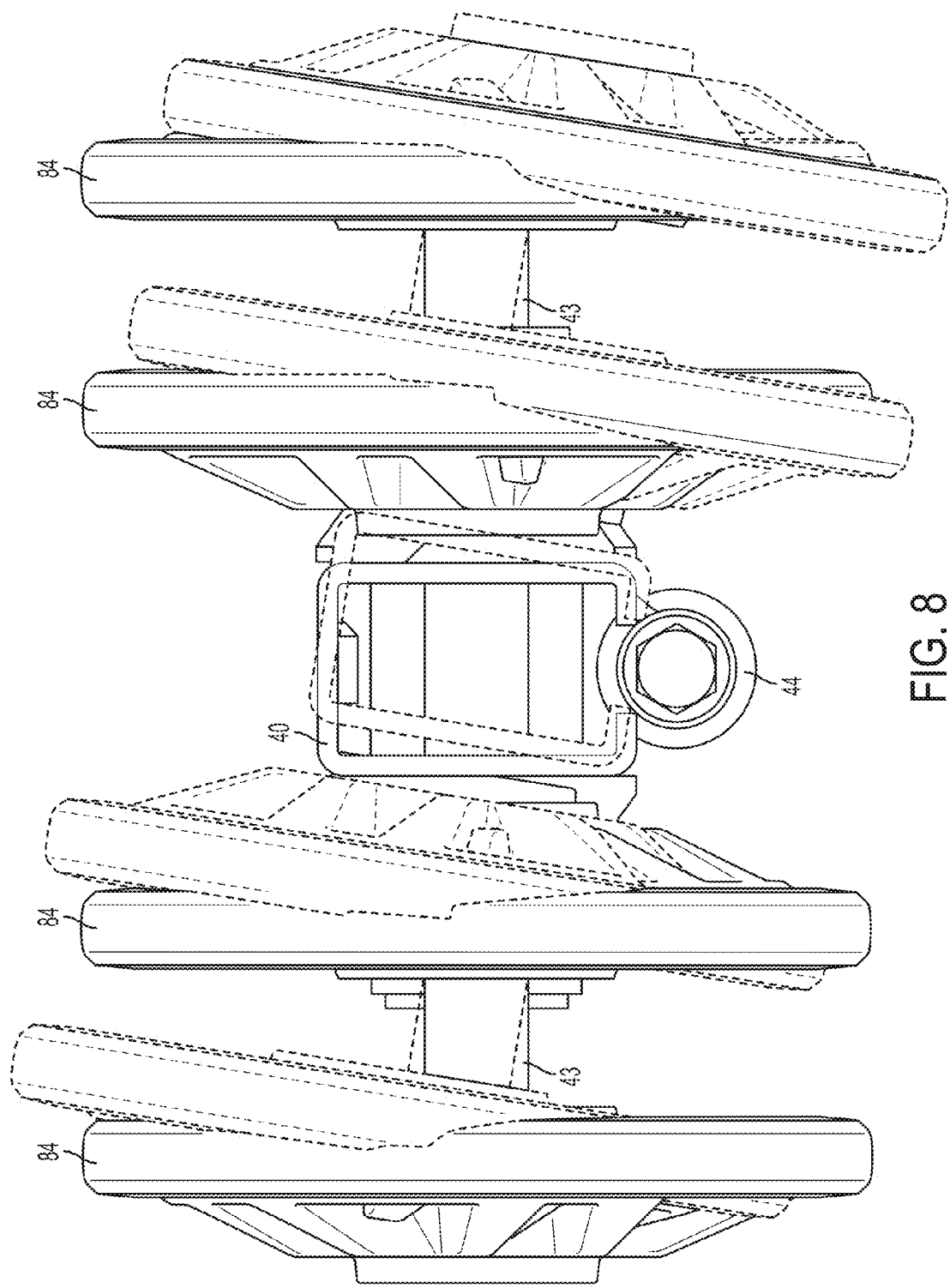
FIG. 8 depicts an exemplary embodiment of a walking beam incorporating an additional degree of freedom (roll)
Figure 9:
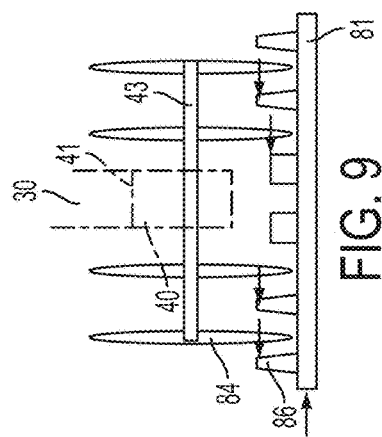
FIG. 9 depicts a bogey wheels mounted to a non roll-pivot equipped walking beam during a turn on flat terrain.
Figure 10:
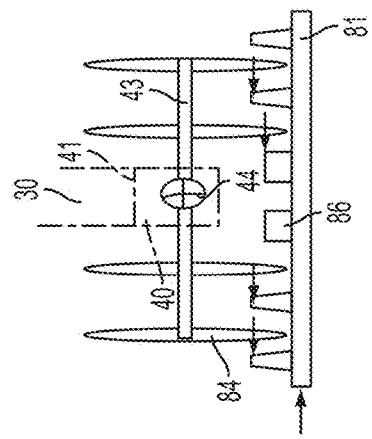
FIG. 10 depicts an exemplary embodiment of bogey wheels mounted to a roll-pivot equipped walking beam during a turn on flat terrain.

Turing to FIG. 8, some embodiments of walking beam 40 incorporate an additional degree of freedom (roll) so that walking beam 40 maintains the pitch function and restricts the yaw movements. By adding the roll function provided by roll-pivot 44, bogie wheels 84 on axles 43 maintain contact with the tracks 80 and track lugs and guides 86 during instances whereby one or both tracks 80 engage a laterally positioned slope that is substantially greater than that of the TUV. This is demonstrated in FIGS. 9-12. More specifically, FIG. 9 depicts bogey wheels 84 mounted to a non-roll-pivot equipped walking beam 40 during a turn on flat terrain. As can be seen, all four of the bogey wheels 84 depicted are able to engage track 80 or track lugs and guides 86 during the turn on flat terrain. FIG. 10 depicts bogey wheels 84 mounted to a roll-pivot 44 equipped walking beam 40 during a turn on flat terrain. As can be seen, all four of the bogey wheels 84 depicted are able to engage track 80 or track lugs and guides 86 during the turn on flat terrain.

Figure 11:
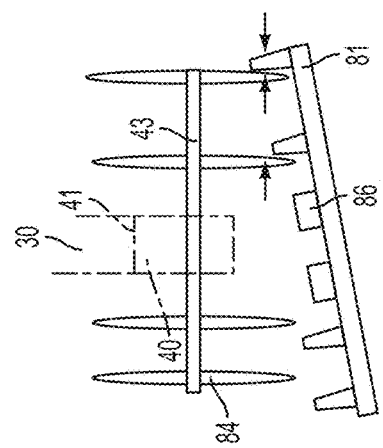
FIG. 11 depicts bogey wheels mounted to a non-roll-pivot equipped walking beam during a turn on sloped terrain.
Figure 12:
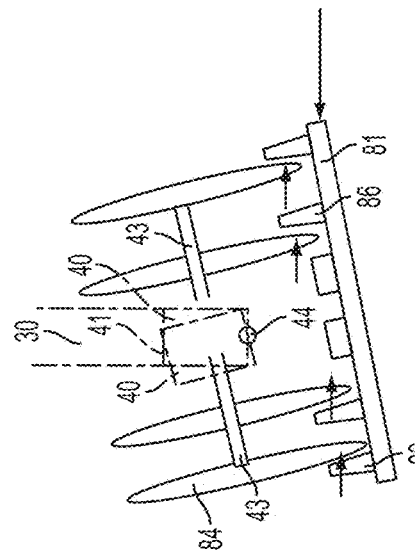
FIG. 12 depicts an exemplary embodiment of bogey wheels mounted to a roll-pivot equipped walking beam during a turn on sloped terrain.

FIG. 11 depicts bogey wheels 84 mounted to a non-roll-pivot equipped walking beam 40 during a turn on sloped terrain. As can be seen, only two of the four bogey wheels 84 depicted are able to engage track 80 or track lugs and guides 86 during the turn on sloped terrain. FIG. 12 depicts bogey wheels mounted to a roll-pivot equipped walking beam during a turn on sloped terrain. As can be seen, all four of the bogey wheels 84 depicted are able to engage track 80 or track lugs and guides 86 during the turn on sloped terrain.

Figure 13:
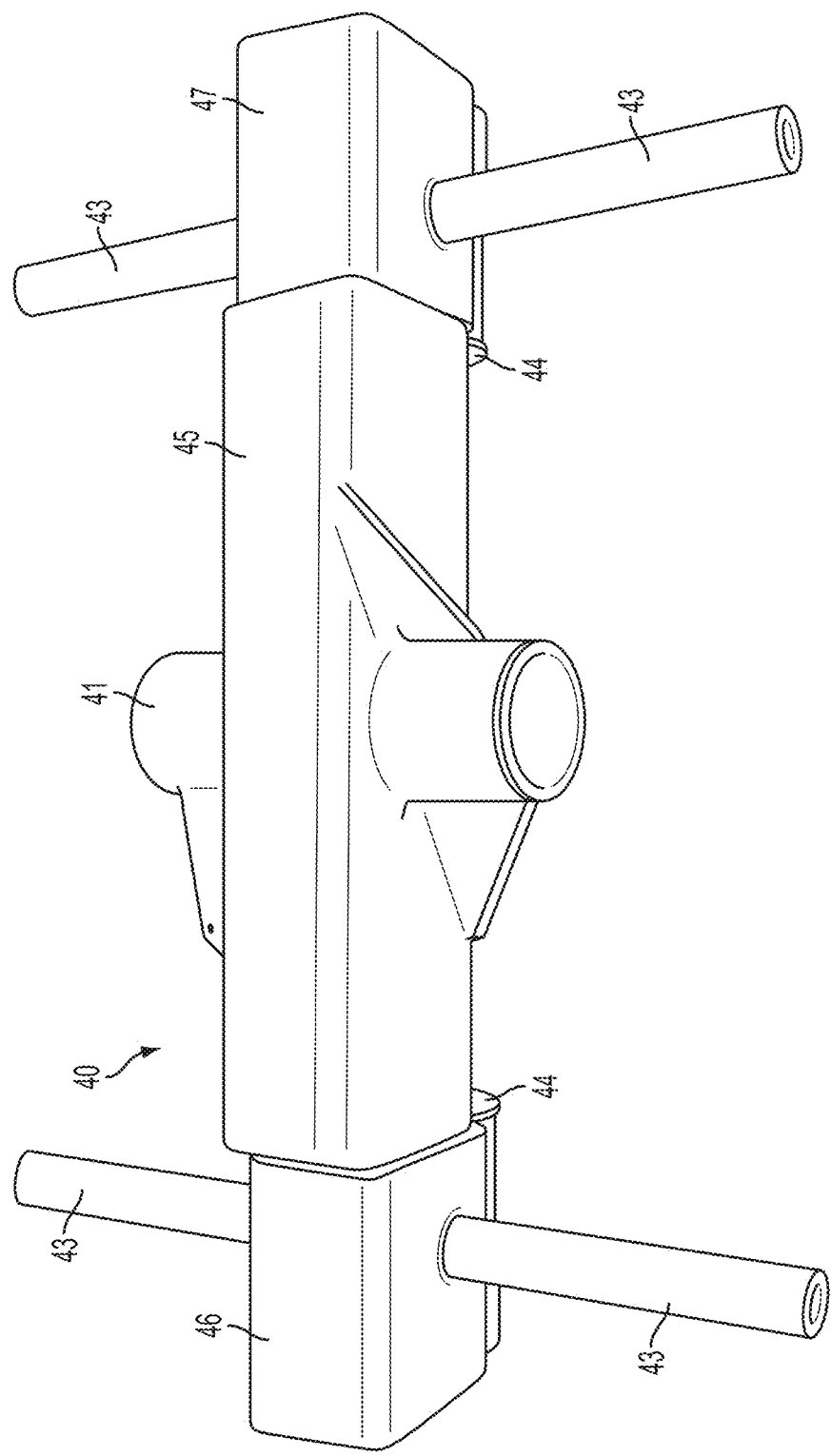
FIGS. 13-15 depicts exemplary embodiments of a roll-pivot equipped walking beam.
Figure 14:
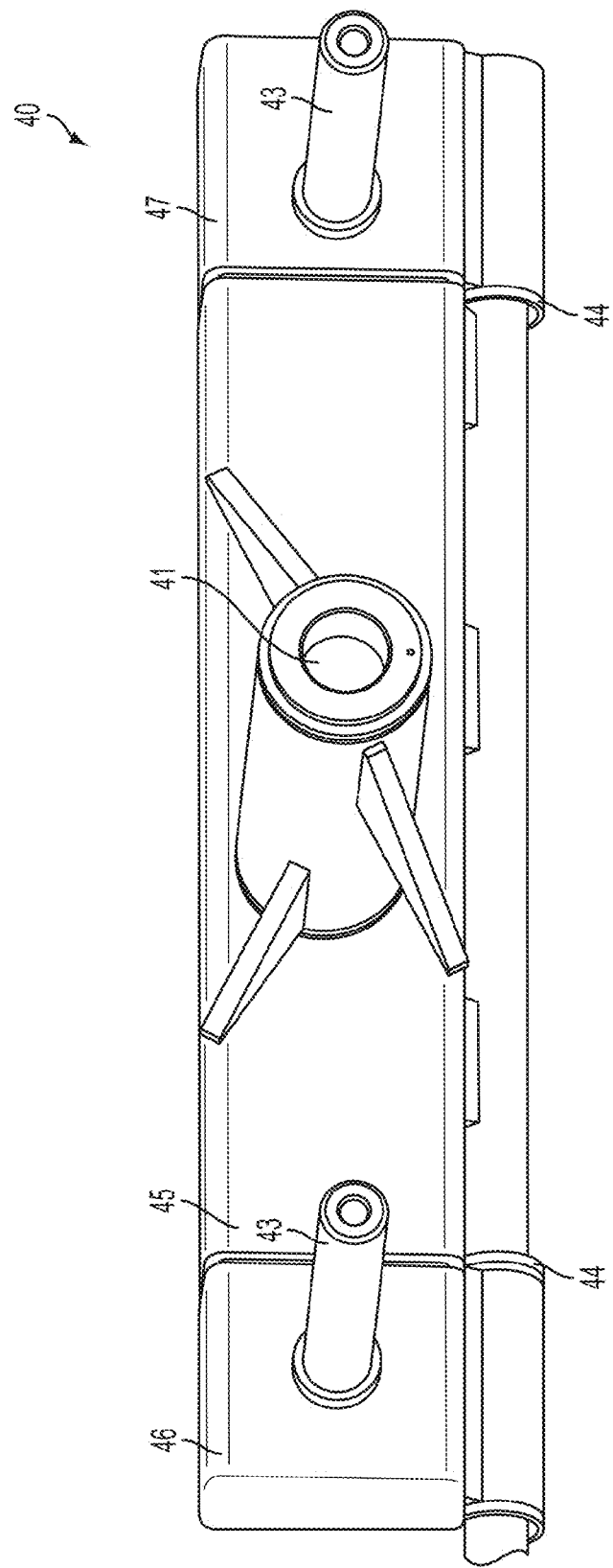
Figure 15:
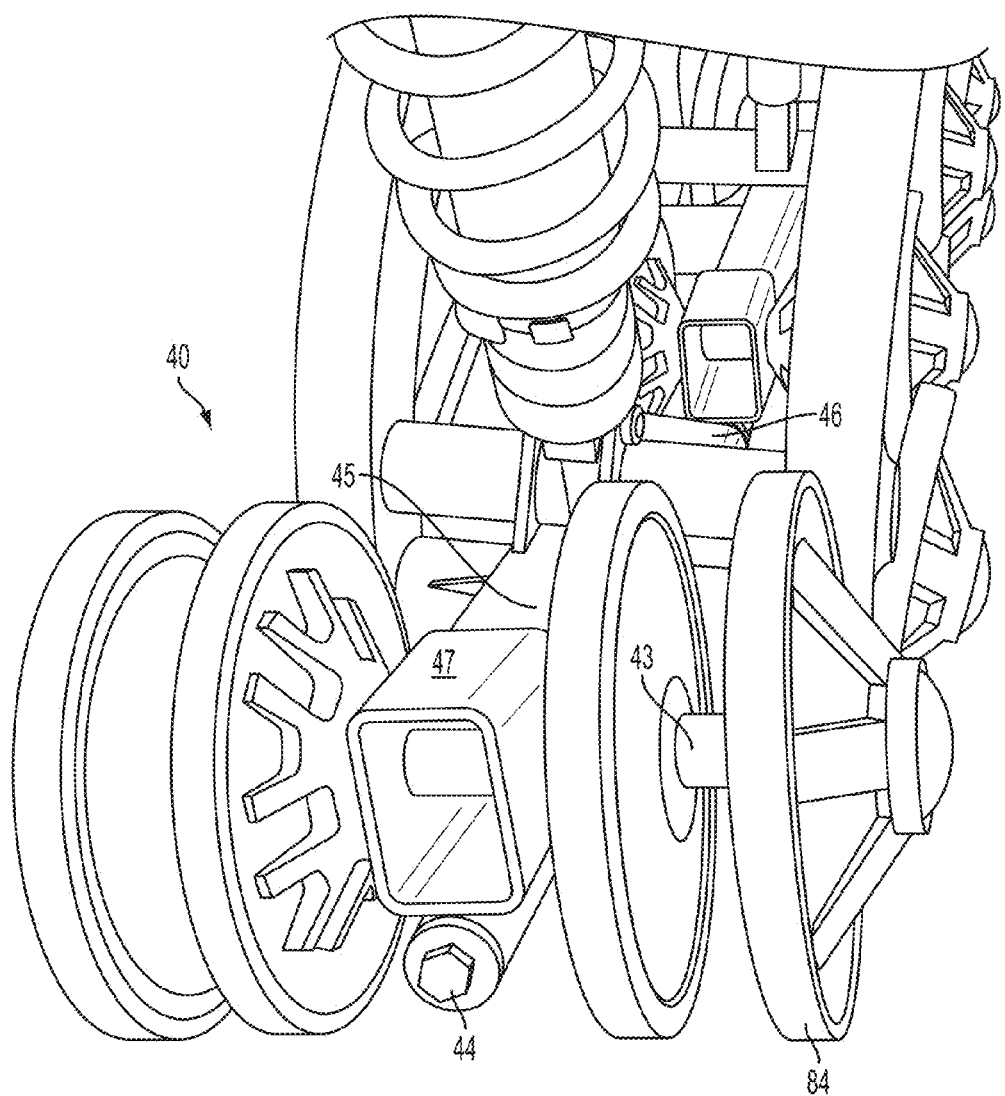

From the attached figures, it is apparent that on some slopes, only two (2) or possibly four (4) of eight (8) bogie wheels of walking beam 40 could be engaging the track 80 or lugs and guides 86 on the tracks 80, which could cause the lugs and guides 86 to deform and allow the bogie wheels 84 to slide over the lugs and guides 86 creating a derailment of track 80. This condition of track derailment is prevented by including roll-pivot 44 in walking beams 40, such as that depicted in FIG. 13, which would permit all the bogie wheels 84 on axles 43 to remain in contact with the track 80 and/or lugs and guides 86 so as to share the loading and minimize deformation of guide lug 86.

Turning to FIGS. 8 and 13-15, it can be seen that in some embodiments, the axis for roll pivot 44 is placed below the walking beam pivot 41 axis and bogie wheel axles 43 in order to enhance stability. Further, in some embodiments, stability is further increased by having a roll pivot 44 between forward section 46 and middle section 45 of walking beam 40, and having another roll pivot 44 between rear section 47 and middle section 45 of walking beam 40. This allows forward section 46 and rear section 47 to independently pivot at different angles from each other, which increases stability on terrain having quickly changing angles.

In additional embodiments, the roll pivot 44 movement is limited to about +/−10 degrees.

Figure 16:
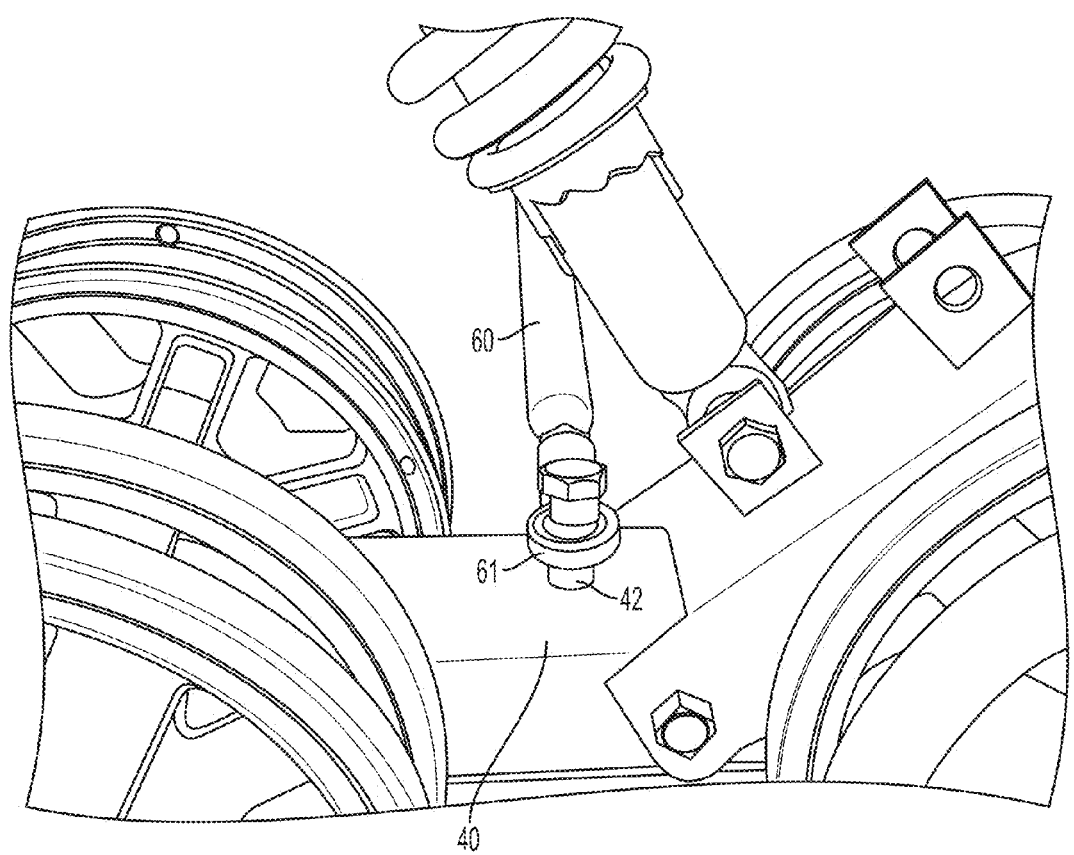
FIGS. 16-17 depicts exemplary embodiment of a walking beam having a pan-hard rod.
Figure 17:
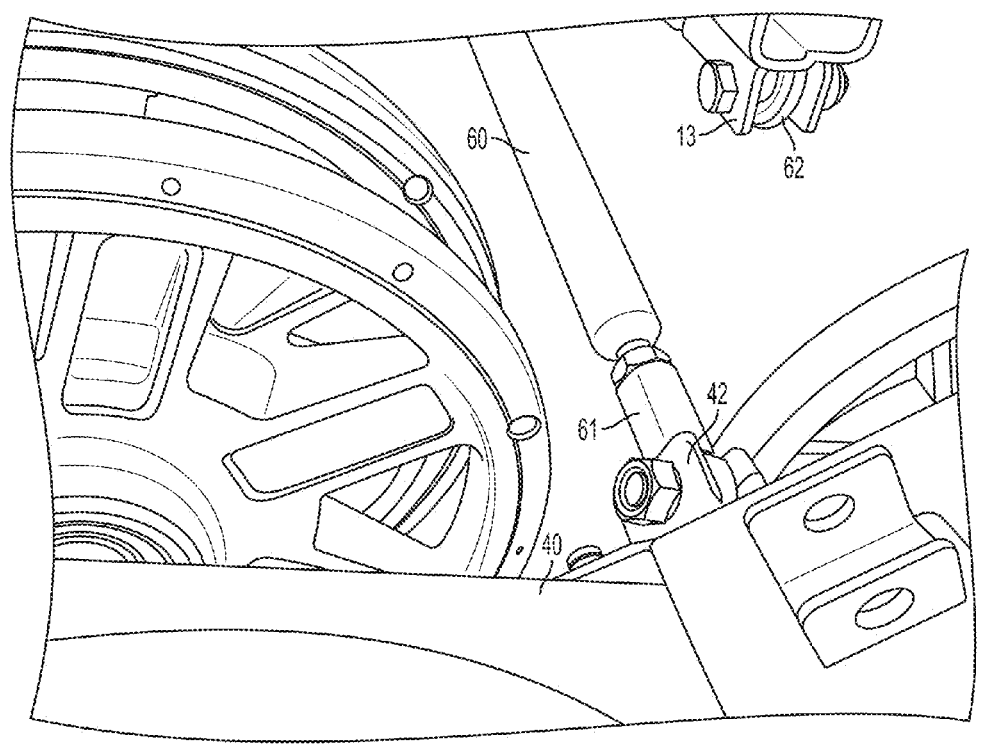

Turning to FIGS. 16-17, pan-hard rods 60 can be used to stabilize the trailing links 30 and to prevent lateral movement of the walking beams 40, but the trailing links 30 can also be designed to minimize lateral deflections, such as by employing multiple swing arms on a trailing link 30. Each pan-hard rod 60 has a rigid rod 63 oriented in the same general orientation as the bogie axles 43 (perpendicular to walking beam 40). Pan-hard rod 60 has a pivot on a first end 61 and a pivot on a second end 62. Pivots on first end 61 and second end 62 can be spherical rod ends or similar devices which connect to walking beam 40 and chassis 10 on the opposite side of TUV from walking beam 40.

Looking at FIGS. 16 and 17, it can be seen that first end 61 of pan-hard rod 60 is connected to pan-hard rod flange 42 of walking beam 40. Further, FIG. 17 depicts two pan-hard rods 60, and demonstrates how first end 61 of pan-hard rod 60 connects to walking beam 40 on one side of TUV, and second end 62 of pan-hard rod 60 connects to pan-hard rod flange 13 of chassis 10 on the opposite side of TUV from walking beam 40. The Pan-hard rods permit movement upwards and downwards only in the vertical plane. There are tremendous de-tracking forces developed on the bogie wheels/walking-beams during TUV turning maneuvers. Yaw reactions of the walking beams 40 are resisted by the trailing links 30 (and the pan-hard rods 60 if used due to the attachment location of the rods 60 to the walking beams 40).

Figure 18:
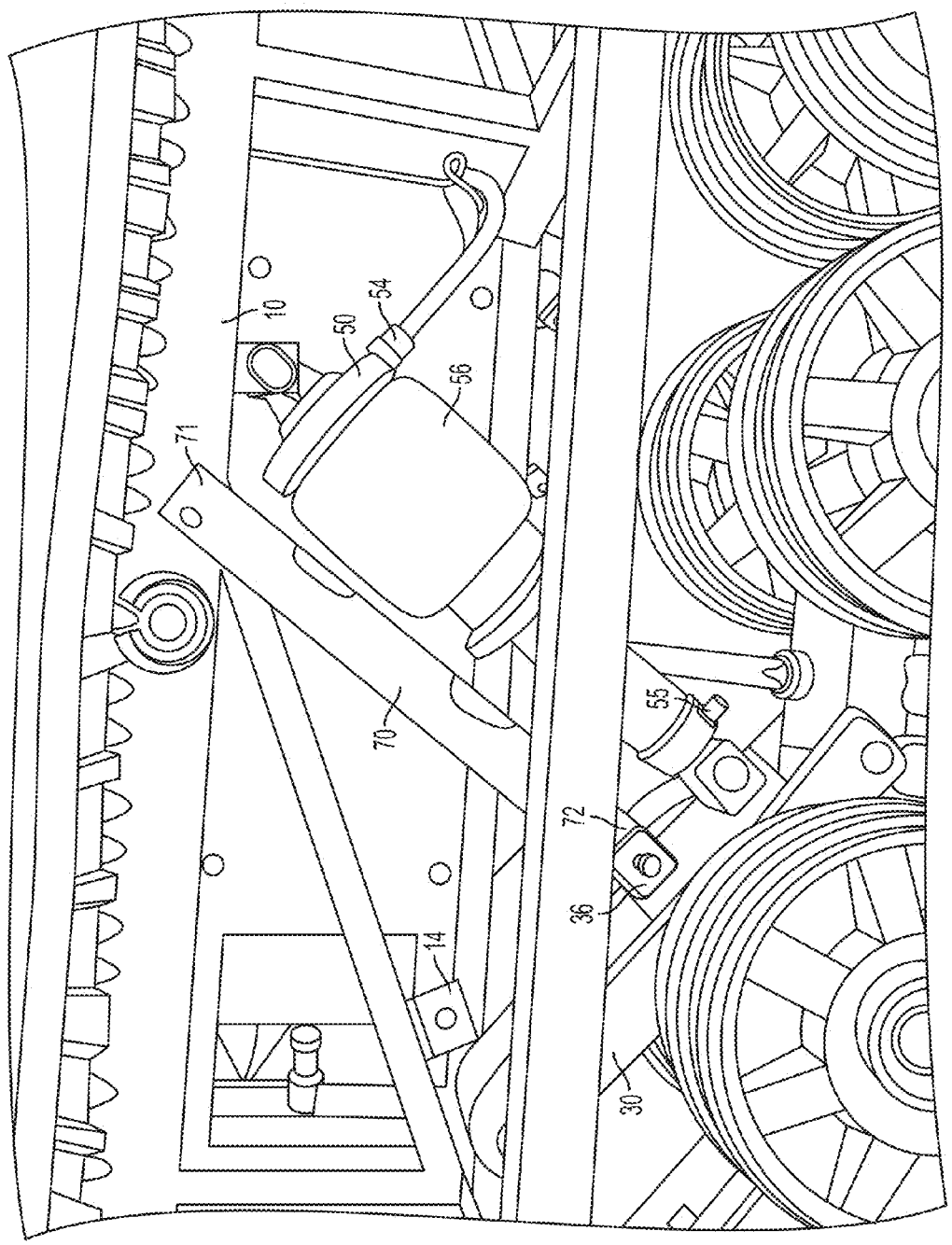
FIGS. 18-19 depicts exemplary embodiments of a trailing link having a mechanical lock-out or pneumatic lock-out.
Figure 19:
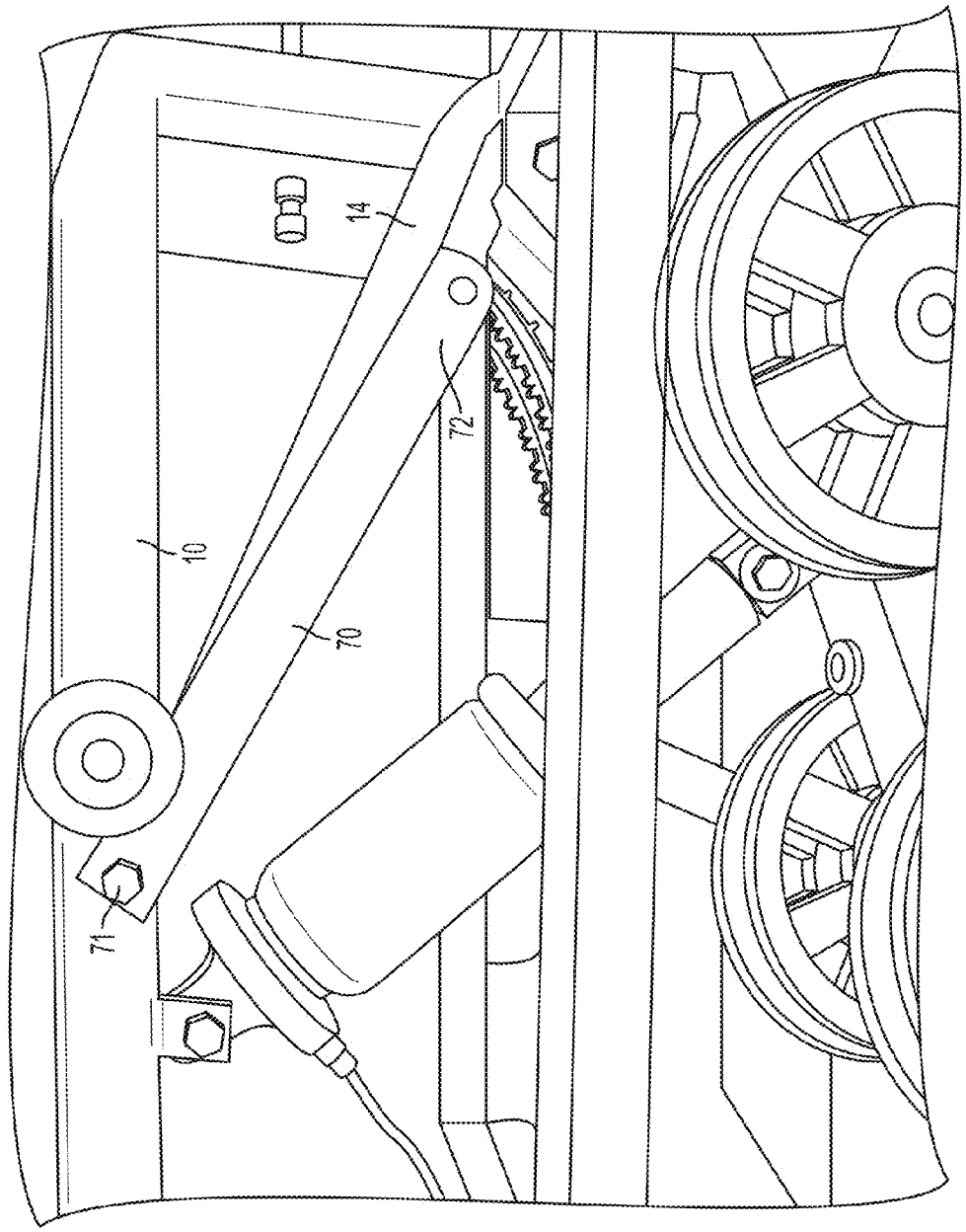

As depicted in FIGS. 18-19, some embodiments of suspension 20 also include a trailing link lock-out, such as a pneumatic trailing link lock-out, using pneumatic shock 50, or mechanical trailing link lock-out, using mechanical lock-out member 70, to reduce or minimize suspension reactions, such as reducing TUV duck-bobbing (front suspension of TUV oscillating up and down) when the front of TUV is equipped with a heavy implement that extends beyond the footprint of tracks 80.

A mechanical trailing link lock-out is achieved using a mechanical lock-out member 70 having a first end 71, which is pivotably attached to chassis 10, and a second end 72. Second end 72 selectively attaches to mechanical lock-out storage flange 14 of chassis 10 or selectively attaches to mechanical lock-out flange 36 of trailing link 30. Accordingly, when mechanical lock-out member 70 is engaged, second end 72 is attached to mechanical lock-out flange 36 of trailing link 30, thereby reducing or minimizing suspension reactions by holding trailing link 30 stationary. However, when mechanical lock-out member 70 is not engaged, second end 72 is attached to mechanical lock-out storage flange 14 of chassis, thereby not limiting the travel of trailing link 30.

The pneumatic trailing link lock-out is achieved by varying the spring rates of pneumatic and/or hydraulic springs of shock 50 such that the spring rates were set high enough that shock 50 functioned in a manner similar to a mechanical lockout member 70 (forward mechanical lockout member 70a, rear mechanical lockout member 70b, or intermediate mechanical lockout member(s) 70c). It is anticipated that in some embodiments, one or more of forward trailing arm 30a, rear trailing arm 30b, or intermediate trailing arm(s) 30c can be mechanically locked-out pneumatically via shock 50 (forward shock 50a, rear shock 50b, or intermediate shock(s) 50*c*) or a mechanical lockout member 70 (forward mechanical lockout member 70*a*, rear mechanical lockout member 70*b*, or intermediate mechanical lockout member(s) 70*c*).

The system includes a Utility Vehicle with a chassis 10, an Occupant Protection System, bench or bucket seating, a Spark or Compression Ignition engine, hydrostatic (pumps and motors) traction-drive system, service and park brake systems, a steering system that controls the speed and direction of the tracks based on steer-angle input, a speed/directional control linkage, a suspension system and ground engaging tracks. The system can also include stored-energy devices, electric generator/alternators, and electric motors. The system can also include tracks 80 to support and transfer the loading of the machine through suspension elements to the terrain it traverses. The system can also include suspension elements including mechanical (coil, leaf, torsion, etc.) springs 50 and hydraulic or pneumatic spring devices 50. The system can also include suspension elements including mechanical (coil, leaf, torsion, etc.) springs 50 and hydraulic or pneumatic spring devices 50 that are individually selected or adjusted so that the mid-sections can support more of the machine weight to reduce the lateral forces generated during turning maneuvers. The system can also include manually or power adjustable suspension elements. The system can also include trailing-links 30 to transfer vertical and lateral loading (mass and payload) of the machine chassis 10 to the walking-beams 40. The system can also include walking-beams 40 with the walking beam pivots 41 biased toward one end or the other, and centered for the mid sections, that transfer the vertical and lateral loading of the machine from the trailing-links 30 to the bogie wheels 84.

The system can also include walking beams 40 that limit yaw movements, but allow pitch and roll movements that maintain bogie wheel 84 contact with the tracks 80. The system can also include bogie-wheels 84 that transfer the vertical and lateral load reactions of the machine that occur during normal operations, turning maneuvers and side hill operations, from the walking-beams 40 to the tracks 80. The system can also include tracks 80 with drive and guide lugs 86 that transfer the vertical, lateral and longitudinal loading of the machine from the bogie-wheels 84 and drive sprockets 85 to the terrain, and this includes the lateral reactions that occur during turning maneuvers and the traction forces generated by the drive sprockets 85. The system can also include return rollers to keep the top of the track running straight between the drive sprocket 85 and idler 83. The system can also include Pan-Hard rods 60 to control and transfer lateral force reactions, generated during side hill operation and turning maneuvers, from the TUV chassis to the trailing links 30 and walking beams 40. The system can also include an adjustable spring-loaded system that maintains track tension. The system can also include increased ground contact area (fore-and-aft) with lower ground pressure. The system can also include a low propensity for track derailment and operation at high travel speeds. The system can also include improved ride quality compared to other suspension systems.

Figure 20:
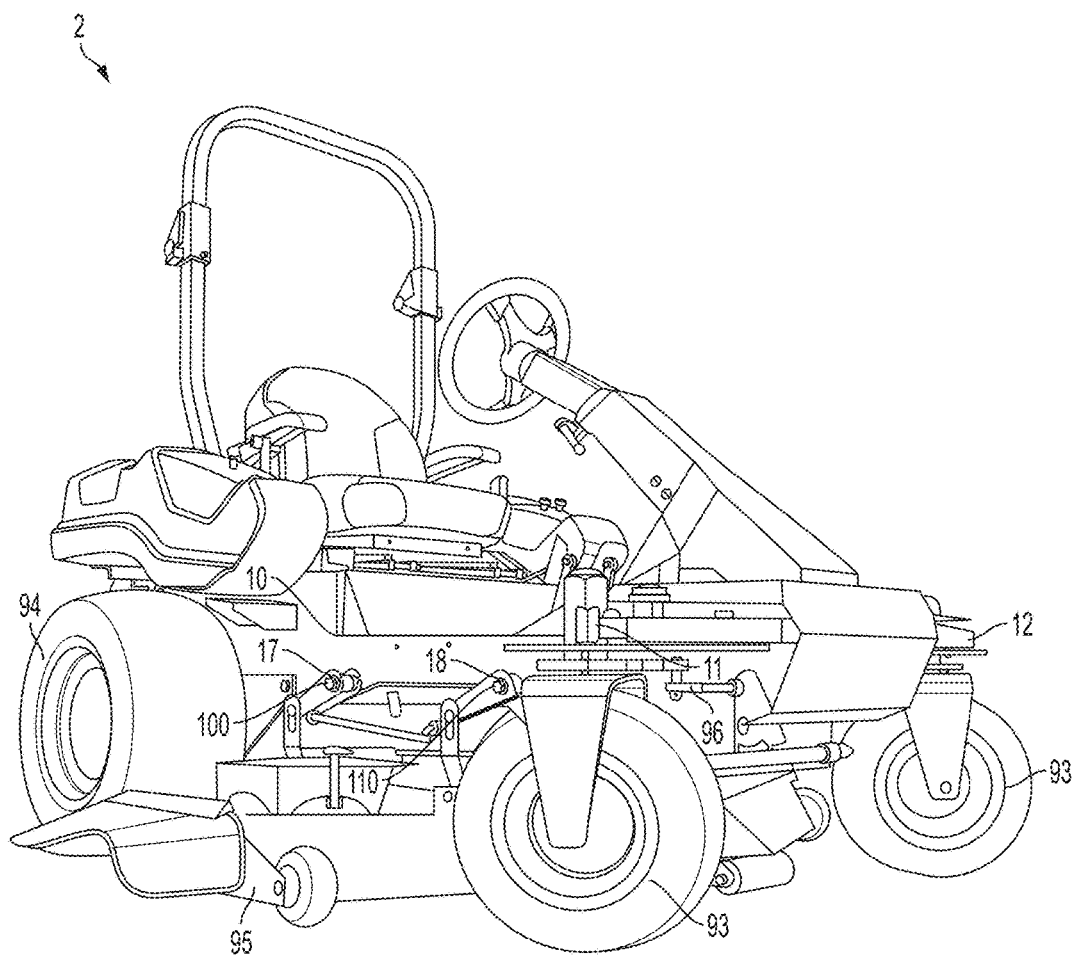
FIG. 20 depicts an exemplary embodiment of a non-tracked utility vehicle.

Further, turning to FIG. 20, utility vehicles 2, which encompasses utility vehicles and utility machines such as Zero-Turn-Mowers, are generally supported by pneumatic tires which produce ground contact patches based on the construction of the tires and their internal pressures. Except for low-pressure pneumatic tires, ground contact pressures for these applications are approximately equivalent to the internal inflation pressures of the pneumatic tires. These pneumatic tires at pressures (generally 10 psi and greater) can limit tire-terrain traction, deformate the terrain, and reduce machine stability (tire roll in both lateral and longitudinal directions). As can be seen, utility vehicle 2 has a chassis 10 with a right side 11 and a left side 12.

Turning to FIGS. 20-29, in an embodiment of this proposal, the rear pneumatic tires/wheels 94 used to provide traction drive are removed from utility vehicle 2, and replaced with endless tracks 80, drive sprocket 85, and suspension 20. The front axle assembly 96 with its' front caster or steerable wheel assemblies 93 are retained. Accordingly, the portion of the utility vehicle's weight that was formerly transferred to the terrain via the rear tires 94 is now transferred to the bottom length 81 of the tracks 80 (that portion contacting the terrain) by trailing link 30 and walking-beam 40 suspension elements incorporating sets of wheels called bogies 84. One trailing link 30 and walking-beam 40 element is used for the suspension 20 to transfer the suspended weight through three to eight (3 to 8) bogie wheels 84 onto the tracks 80 while cushioning the ride over uneven and rough terrain. Configurations are anticipated that incorporate more or less trailing links 30, walking beams 40, and bogie wheels 84, but in this exemplary embodiment, two (2) trailing links, two (2) walking beams, and eight (8) bogie wheels are depicted, with one (1) trailing link, one (1) walking beam, and four (4) bogie wheels on each side of utility vehicle 2.

The trailing-link suspension 20 is a design in which links 30 are connected between (and perpendicular to and forward of) the walking beam 40 and the chassis 10. The trailing-link suspension 20 uses just one swing-arm type trailing link 30 and an adjustable spring-shock 50 to locate a walking-beam 40 longitudinally and laterally. There are tremendous de-tracking forces developed on the bogie wheels 84 and walking-beams 40 during turning utility vehicle 2 maneuvers. Yaw reactions of the walking-beams 40 are resisted by the trailing links 30.

Walking beam suspensions 20 are particularly useful in off-road applications incorporating tracks 80, since they offer great lateral stability, ride comfort, and only tend to raise load height minimally when small changes in the terrain are encountered. Walking beams 40 are assemblies with a pivot point 41 in a middle section 45, about which there is a forward section 46 and a rear section 47. Each of the forward section 46 and rear section 47 of the beam 40 incorporates an axle 43 containing two (2) bogie wheels for a total of four (4) bogie wheels per walking beam. Pivoting (pitching) forward section 46 and rear section 47 of the beam 40 at pivot point 41 allow for track segment movements with bounce (jounce) and rebound forces being centralized and equalized (or proportioned) at the walking beam pivot 41, generally with minimal trailing link 30 reaction, even during large pitch movements of the walking beam 40. Walking beams 40 may incorporate torsion or jounce elastomeric blocks to absorb shock and control pivot rotation (pitch).

In some embodiments, pivot point 41 of the walking beam 40 is biased toward forward section 46 or rear section 47 of the beam 40. The biasing of pivot point 41 of walking beam 40 results in an increase of the suspension reaction transferred by the walking beam to the trailing link that is directly proportional to the decrease in distance between bogie wheel axle 43 and walking beam pivot point 41. This effectively provides different suspension rates in different track segments. In the embodiment of walking beam 40 depicted in FIG. 21, pivot point 41 of walking beam 40 is biased toward forward section 46, which maximizes the effective bottom length 81 of track 80 (increases floatation and reduces ground pressure).

Transfer of power to the tracks 80 is accomplished by drive wheel sprockets 85, that are powered by transmissions or motors (traction drives) 115 that engage holes or lugs 86 in/on the inner surface of track links that drive the track 80. Stated alternatively, the transfer of power to the tracks 80 is accomplished by drive wheel sprockets 85, that are powered by traction drives 115 that engage holes or lugs 86 in/on the inner surface of track 80. The walking-beam 40 is used primarily to tension the track 80 but also to provide limited suspension as described above. The boogie wheels 84 serve as track tensioning idlers and the walking-beam 40 allows track 80 to climb over obstacles.

Figure 1:
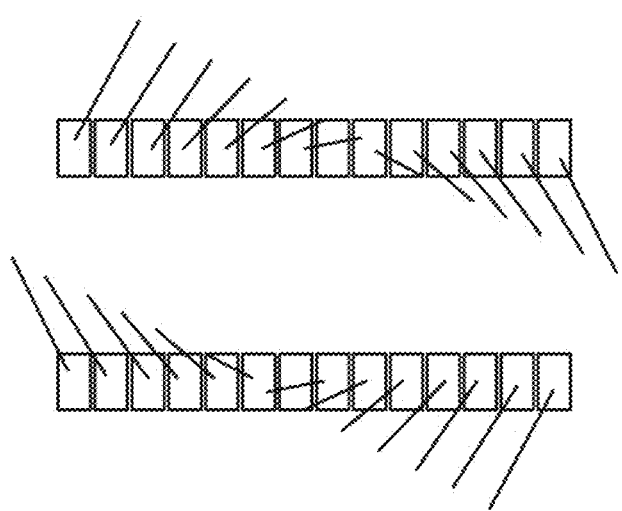
FIG. 1 is a force-direction diagram for a tracked utility vehicle executing a neutral axis (Zero) turn.

Turning to FIGS. 20-23, since it takes considerable power to steer a tracked vehicle 2, in some embodiments, a steerable front axle 96 is utilized and it is synchronized with the traction drive transmissions or motors 115 driving track 80, which emulates Ackermann Steering geometry. As the vehicle 2 turns, the leading and trailing ends of the track footprint, or contact patch, skid sideways, perpendicular to the direction the tracks roll, such as is shown in and described above in conjunction with FIGS. 1-2.

For a neutral axis (or "zero') turn, which typically requires as much power to execute as to travel at full speed without turning for tracked machines 2, the steered front wheels 93 assist in this maneuver to reduce terrain deformation and power consumption. Turns of greater radii will require less power, as the energy required to overcome friction (or terrain abrasion) is spread out over a longer period of time.

As can be seen, FIGS. 20-29 depict the right side suspension 20 and chassis 10 of utility vehicle 20 (right side from perspective of utility vehicle operator). For the sake of brevity, it is understood that the left side suspension 20 components (shock 50, trailing link 30, walking beam 40) and chassis 10 of utility vehicle 2 are a mirror image of the right side being described. As was described above, the right side suspension 20 has one shock per trailing link 30. Further, the right side suspension has one trailing link 30 per walking beam 40. It is understood that the right and left side trailing links 30 operate independently from each other, which allows for more smooth travel over uneven terrain.

Figure 24:
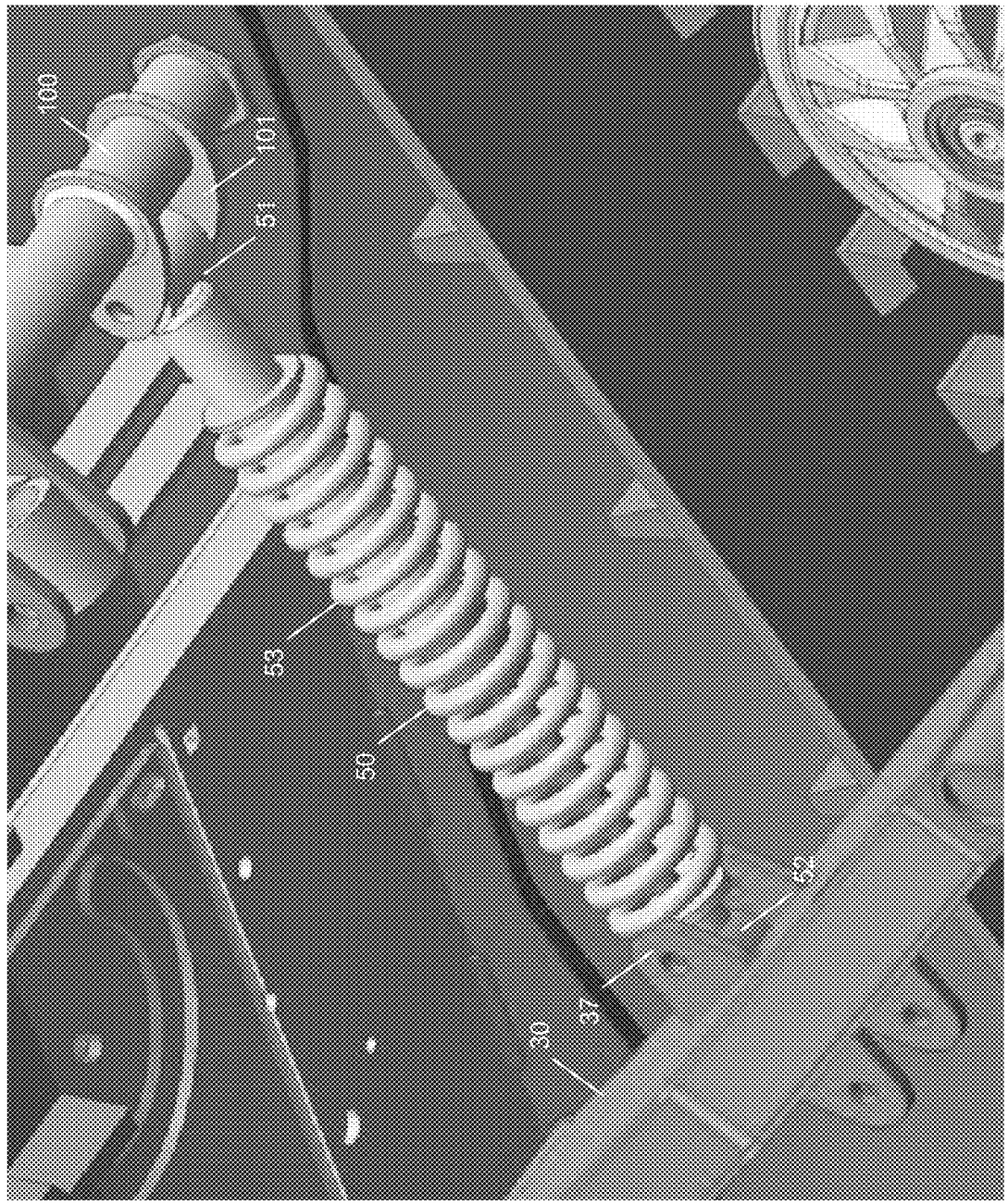
FIG. 24 depicts an exemplary embodiment of a shock.

FIG. 24 is a close up depiction of shock 50, tension shaft 100 and trailing link 30. Shock 50 has a first end 51 and a second end 52. The first end 51 is pivotably connected to tension shaft 100 at tension shaft shock flange 101. It is understood that a tension shaft shock flange 101 is present on the right side of tension shaft 100 for the shock 50 on right side suspension 20, and a separate tension shaft shock flange 101 is present on the left side of tension shaft 100 for the shock 50 on left side suspension 20. The second end 52 is pivotably connected to shock flange 37 of trailing link 30. Preload of shock 50 is dictated by the load placed upon spring 53 by mechanical and air means. As was stated above, for hydraulic shocks, rough preload can be adjusted via pneumatic pressure through shock preload air valve and an air pump, and finer preload adjustments can be made mechanically by adjusting the position of the collar. For mechanical shocks, preload adjustments can be made mechanically by adjusting the position of the collar. For air shocks, preload can be adjusted via pneumatic pressure through preload air valve 55 and an air pump.

In some embodiments, shock 50 can act as a pneumatic trailing link lock-out. Pneumatic trailing link lock-out can be achieved by varying the spring rates of pneumatic and/or hydraulic springs of shock 50 such that the spring rates are set high enough that shock 50 functions in a manner similar to a mechanical lockout member 70 described above.

Figure 25:
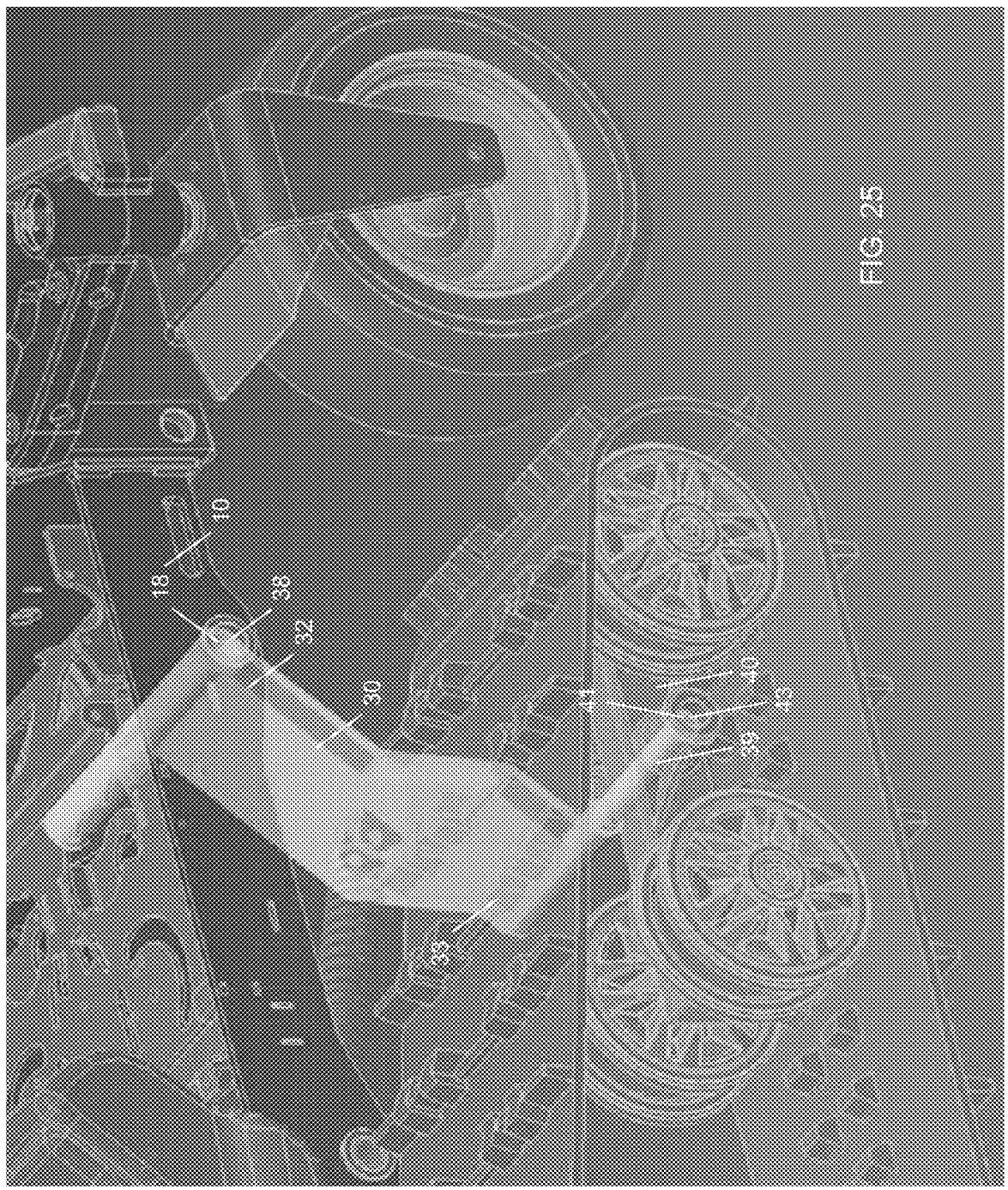
FIG. 25 depicts an exemplary embodiment of a trailing arm and walking beam.
Figure 26:
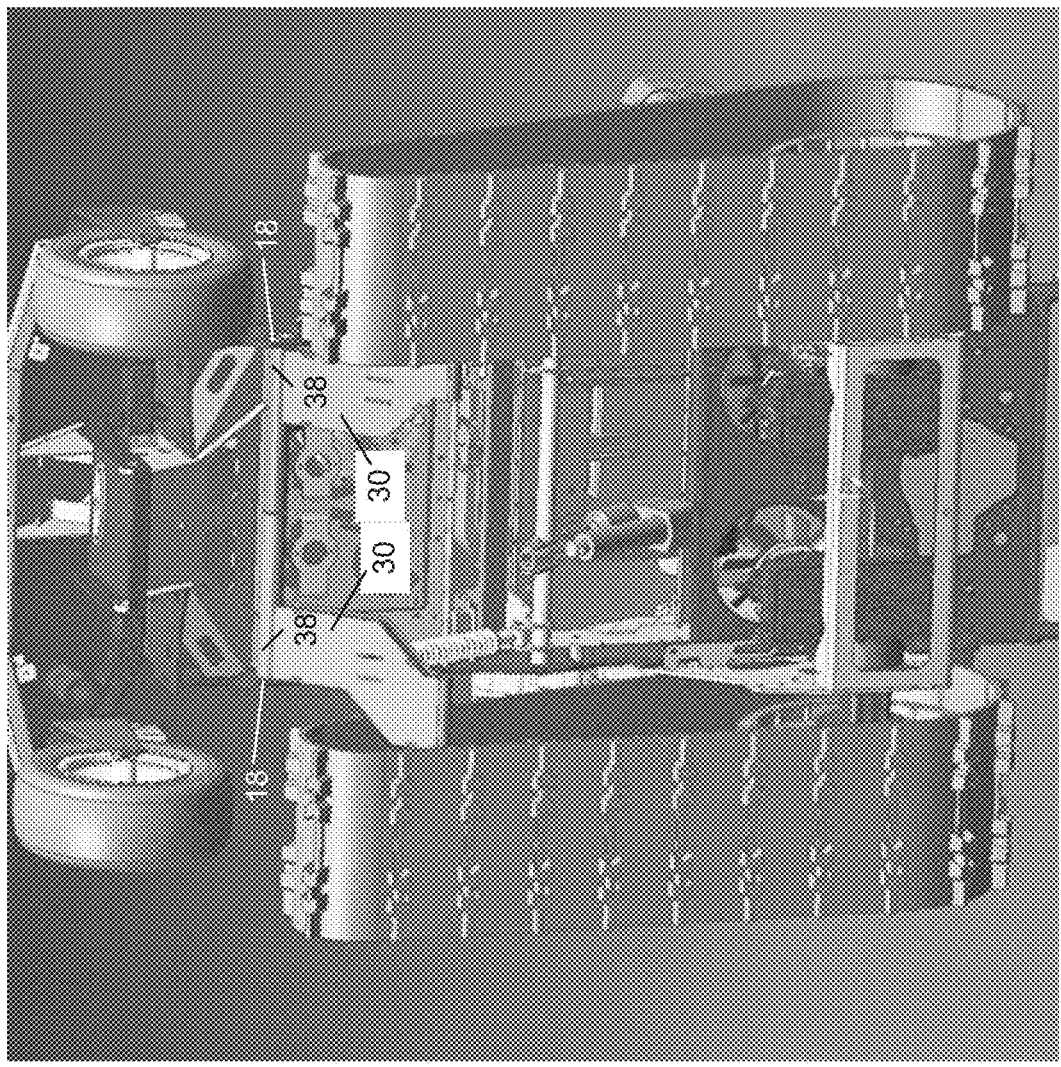
FIG. 26 depicts the underside of an exemplary embodiment of a partially tracked utility vehicle.

FIG. 25-26 depicts trailing link 30 having a first end 32 and a second end 33. In some embodiments, the first end 32 has a flange 38 pivotably connected to trailing link aperture 18 of chassis 10. In some embodiments, flange 38 of the right side and left side trailing links 30 rotate about a common shaft seated in trailing link apertures 18 on the left and right sides of chassis 10. In other embodiments, a separate fastener is used to pivotably connect the right side trailing link flange 38 to the right side trailing link aperture 18, and a separate fastener is used to pivotably connect the left side trailing link flange 38 to the left side trailing link aperture 18. In some embodiments, the second end 33 has an axle 39 that pivotably connects to walking beam 40 at walking beam pivot 41 and acts as walking beam axle 43. In other embodiments, second end 33 has a flange that pivotably connects to walking beam 40 at walking beam pivot 41. FIG. 26 once again demonstrates how right side trailing link 30 and left side trailing link 30 are not physically synchronized and pivot independently of one another.

Figure 27:
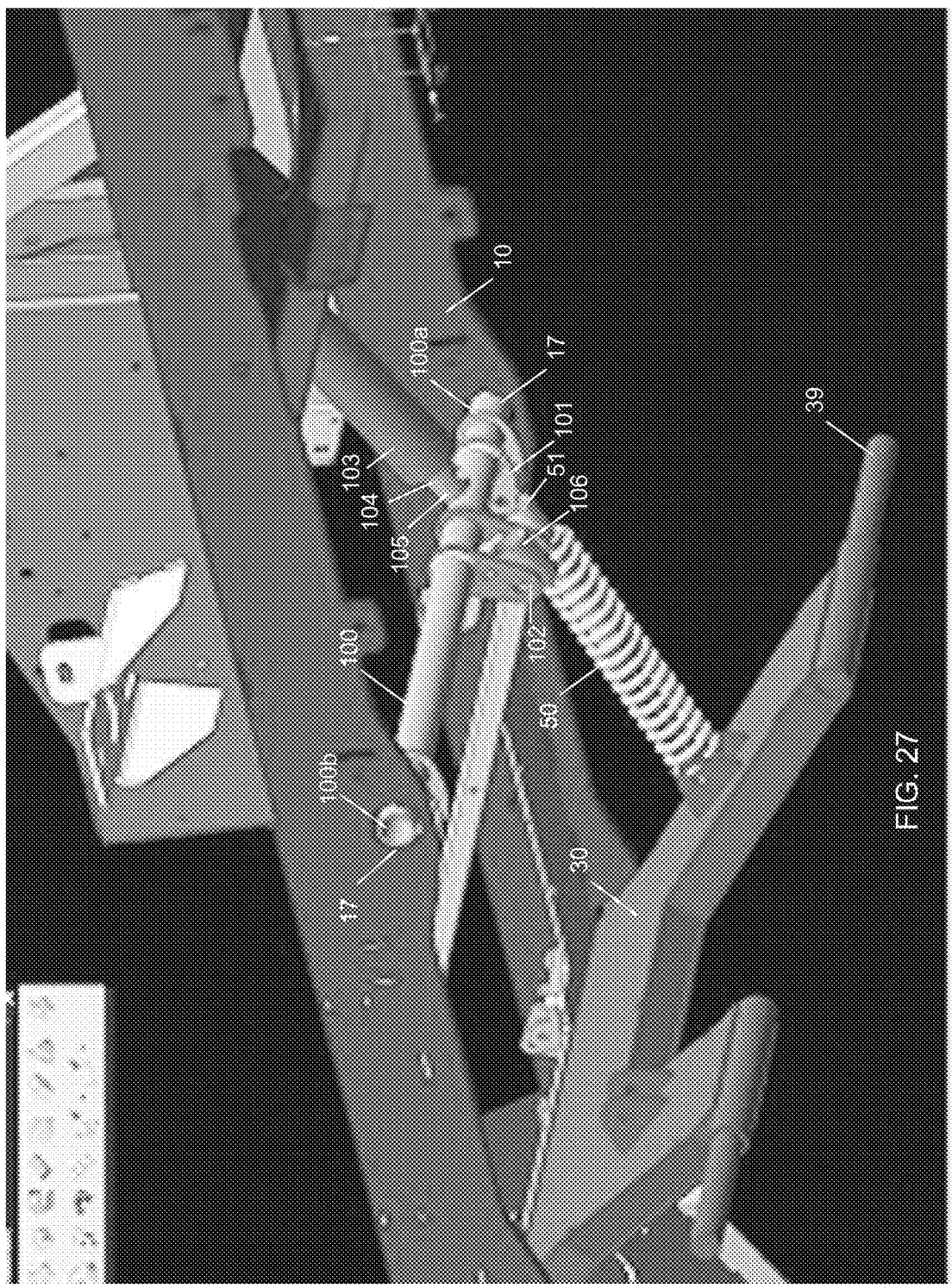
FIGS. 27-28 depict an exemplary embodiment of a tension bar and walking beam of a partially tracked vehicle.
Figure 28:
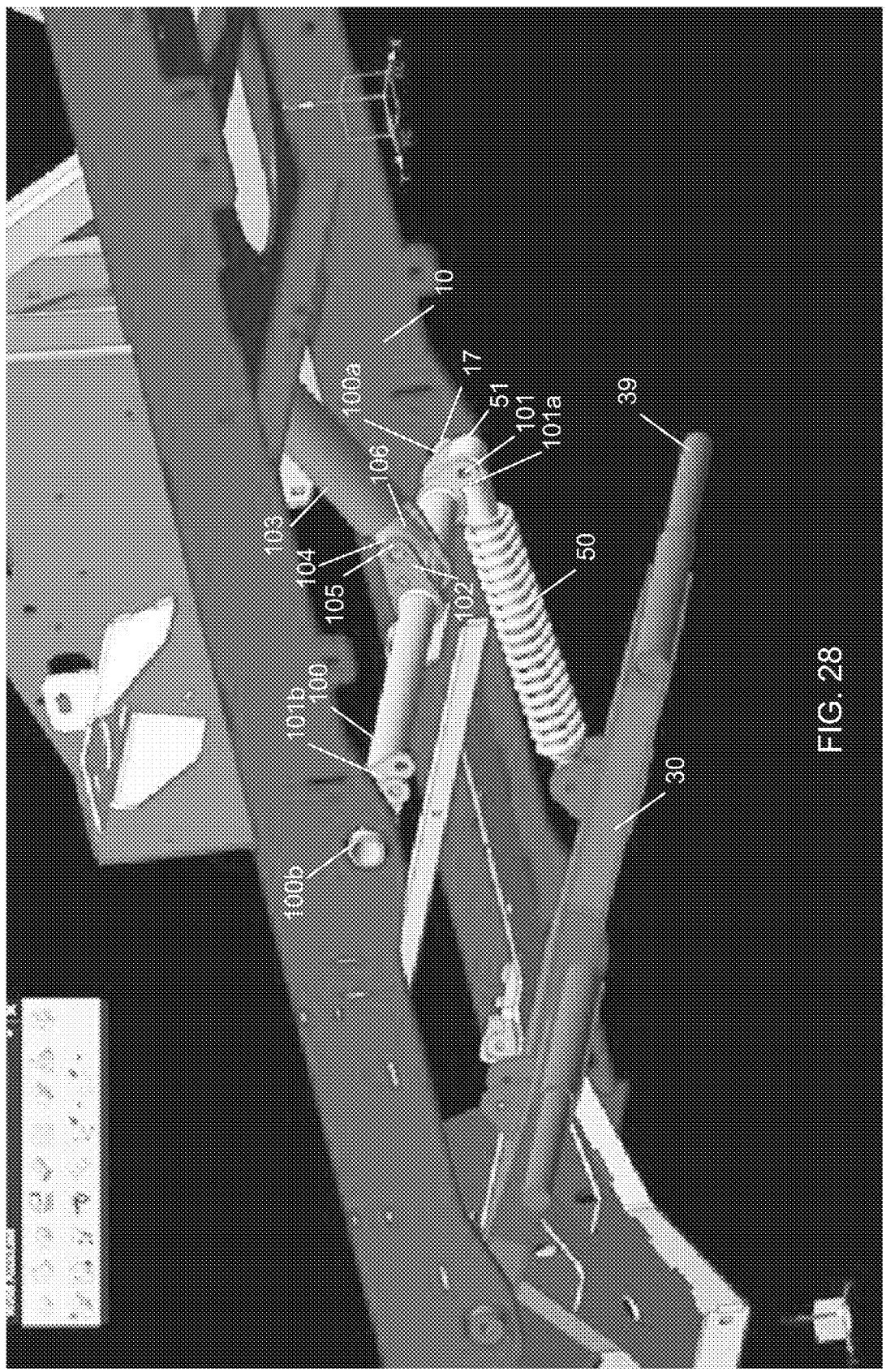

FIGS. 27-28 depict tension shaft 100, which has a first end 100a pivotably mounted to the right side of chassis 10 at pivot shaft aperture 17, and a second end 100b pivotably mounted to the left side of chassis 10 at pivot shaft aperture 17. Tension shaft 100 has an actuator flange 102 that is pivotably connected to a distal end 105 of shaft 104 of actuator 103. In some embodiments, a tension shaft actuator adapter 106 pivotably connected to actuator flange 102 receives and pivotably connects distal end 105 to actuator flange 102. Actuator 103 is fixed to chassis 10. Tension shaft 100 also has a shock flange 101 that is spaced apart rotationally from actuator flange 102. Shock flange 101 is pivotably connected to a first end 51 of shock 50, which is connected to trailing link 30. Accordingly, the vertical distance between trailing link axle 39 (with associated walking beam 40) and chassis 10 can be changed by rotating tension shaft 100, which is controlled by actuator 103. Therefore, FIG. 28 shows trailing link 30 in a fully retracted position where actuator shaft 104 is fully extended, and FIG. 27 shows trailing link 30 in a fully extended position where actuator shaft 104 is fully retracted. Retracting and extending trailing link 30 also increases the tension of tracks 80 and increases the ride height of vehicle 2. The position of actuator shaft 104 is user controlled via an actuator switch (not shown).

As was stated above, a shock flange 101 is provided for both right shock 50 and left shock 50. In one embodiment, the right shock flange 101a is located between actuator flange 102 and tension shaft first end 100a, and left shock flange 101b is located between actuator flange 102 and tension shaft second end 100b. Right shock flange 101a and left shock flange 101b are parallel with respect to each other. Right shock flange 101a and left shock flange 101b are spaced apart rotationally from actuator flange 102 with respect to the axis of rotation of tension shaft 100.

Figure 29:
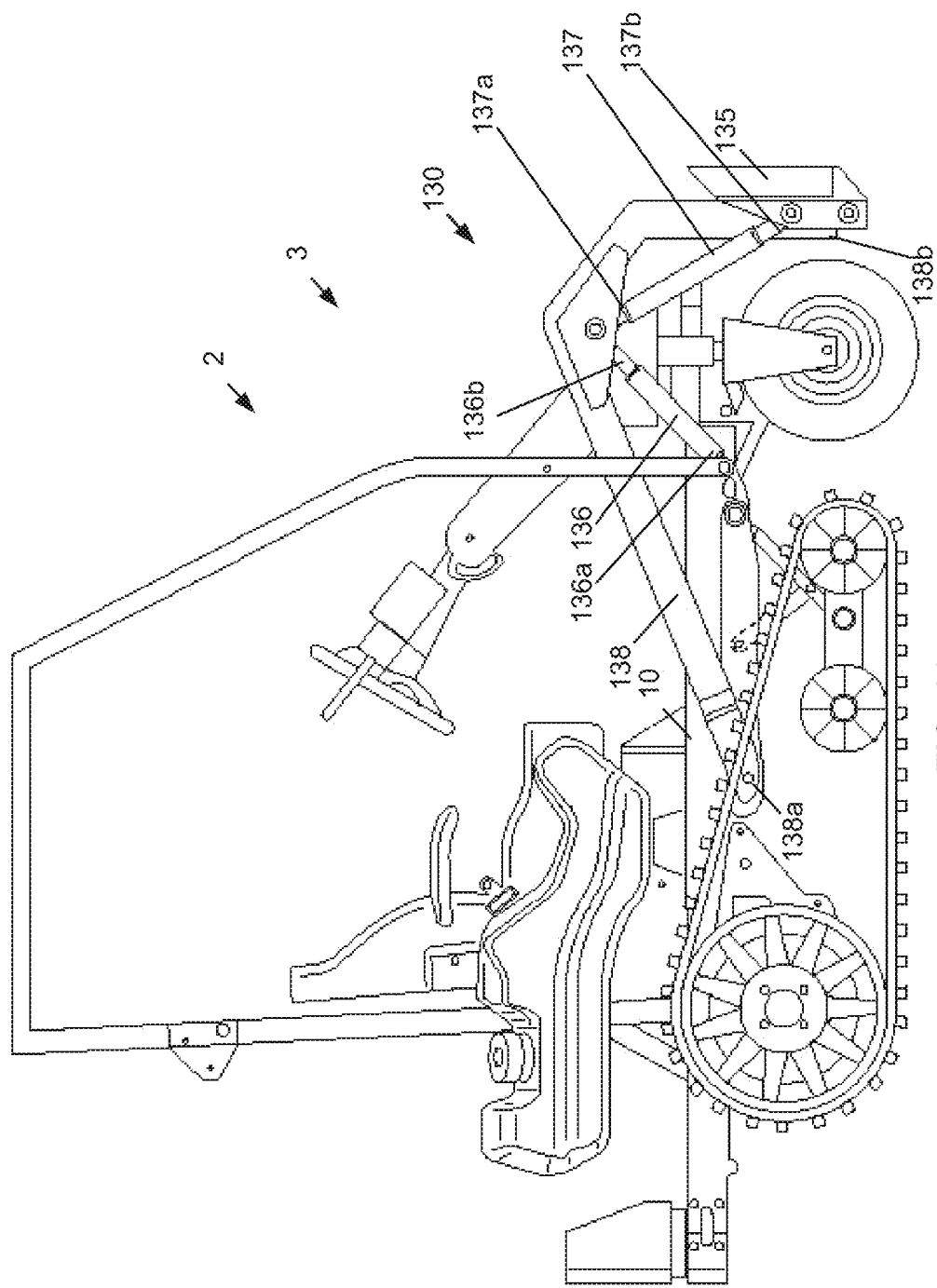
FIG. 29 depicts an exemplary embodiment of a partially tracked utility vehicle.

FIG. 29 depicts an attachment boom assembly that is present on some embodiments of vehicle 2. Attachment boom assembly 130 has a boom 138 with a first end 138a pivotably attached to chassis 10 and a second end 138b pivotably attached to attachment interface 135. Attachment interface 135 is configured to connect with a variety of implements (outdoor power equipment and chore machines and accessories, including, but not limited to a mower, show thrower, brush, blade, and bucket). Attachment boom assembly 130 has a lift cylinder 136 having a first end 136a pivotably connected to chassis 10 and a second end 136b pivotably connected to boom 138. Lift cylinder controls the vertical height of attachment interface 135 and any attached implement. Some embodiments of boom assembly 130 have a pitch cylinder 137 having a first end 137a pivotably connected to boom 138 and a second end pivotably connected to attachment interface 135. Pitch cylinder 137 controls the pitch of attachment interface 135 and any attached implement.

Figure 21:
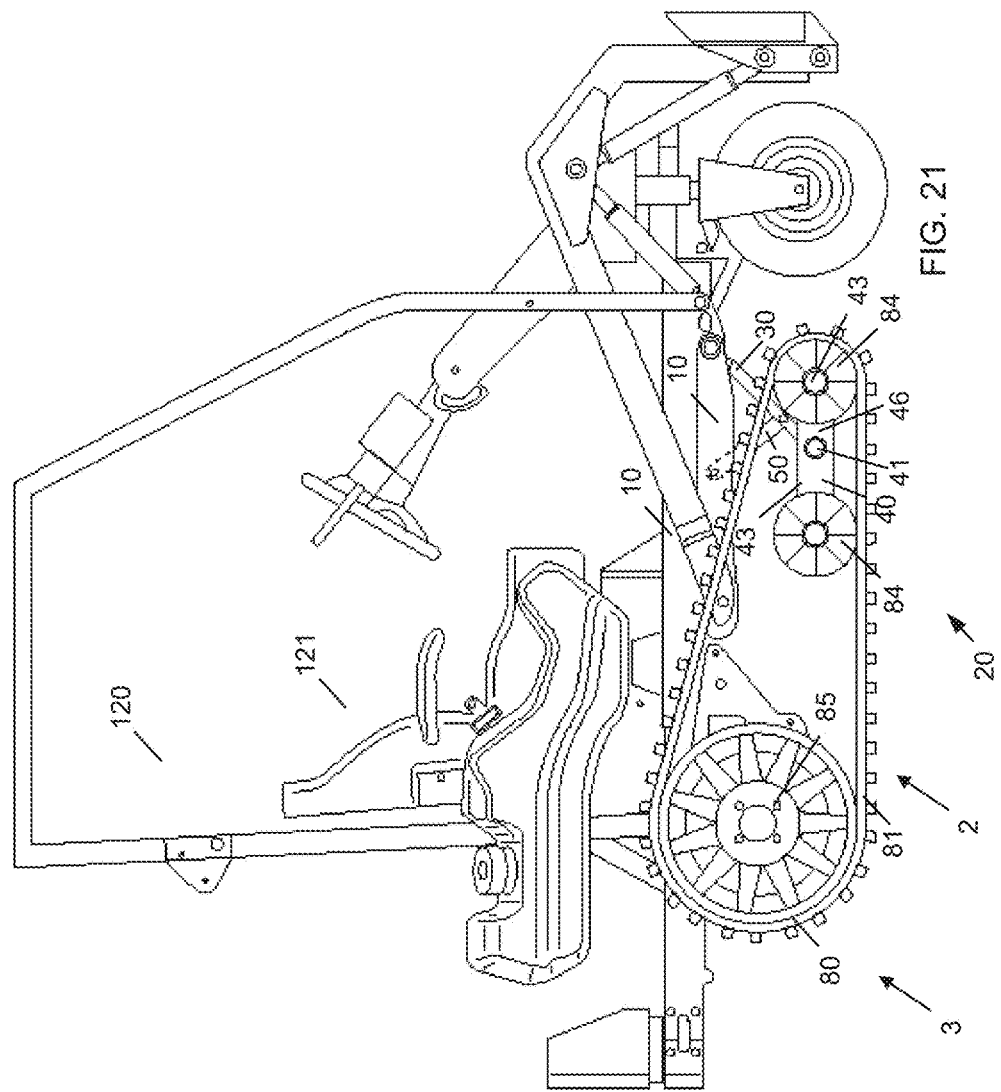
FIG. 21 depicts an exemplary embodiment of a partially tracked utility vehicle.
Figure 22:
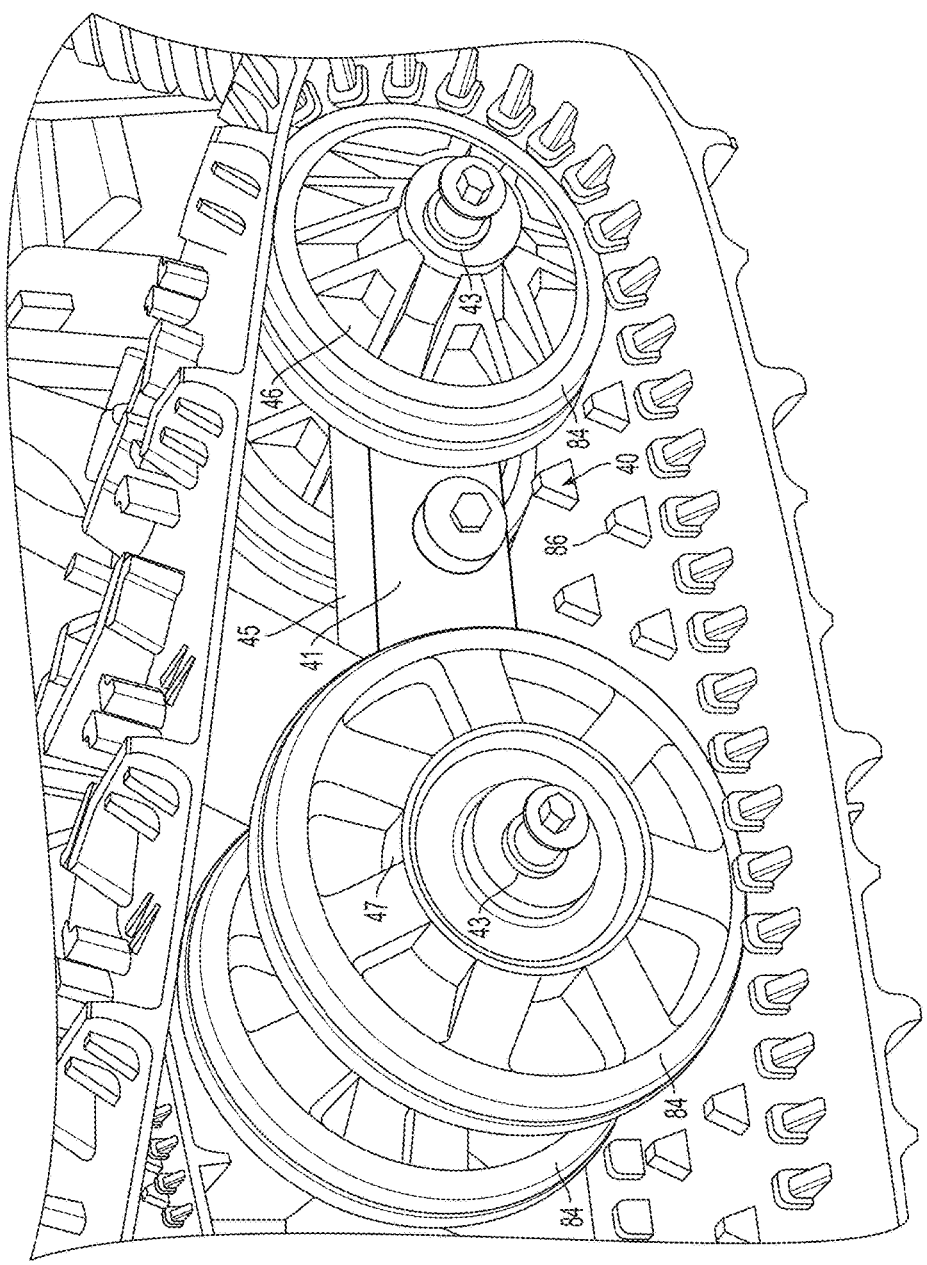
FIG. 22 depicts an exemplary embodiment of a walking beam.
Figure 23:
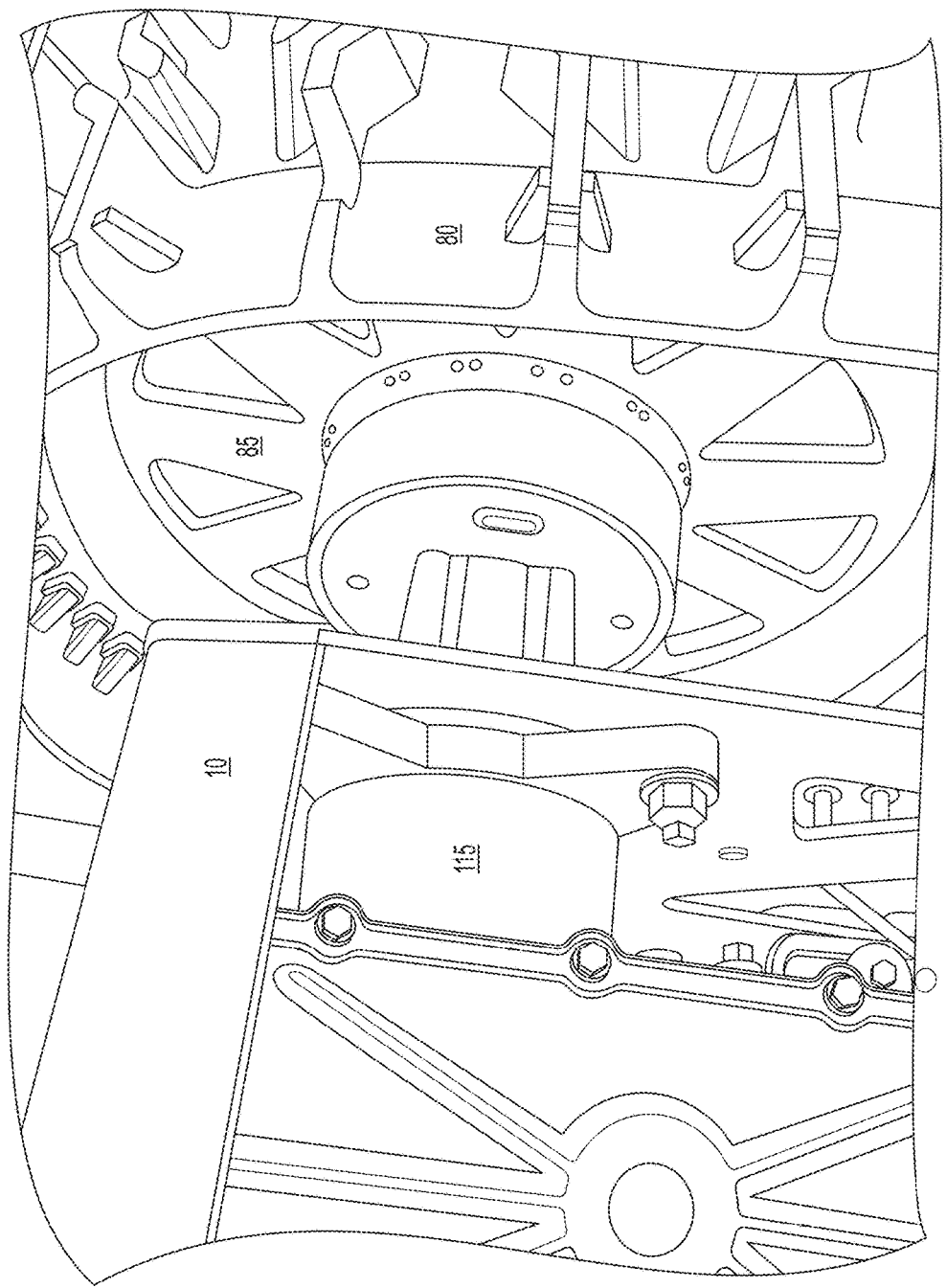
FIG. 23 depicts an exemplary embodiment of a traction drive.

In another embodiment, also disclosed is a utility vehicle conversion 3 as shown in FIG. 21 and described in conjunction with FIGS. 20-29, which replaces rear traction drive tires 94 of utility vehicle 2 (and any other parts that interfere with tracks 80 and suspension 20, such as deck 95). For the sake of brevity, this utility vehicle conversion will be described with respect to the suspension components 20 and chassis 10 on the right side of utility vehicle 2. It is understood that the left side suspension components 20 and chassis 10 of utility vehicle 2 will be a mirror image of the right side described herein. The utility vehicle conversion 3 provides tracks 80 for a traction drive 115 of a utility vehicle 2 having a chassis 10. The utility vehicle conversion 3 has a trailing link 30 with a first end 32 pivotably connectable to the chassis 10 and a second end 33 pivotably connectable to a walking beam 40 at a walking beam pivot 41.

Further provided in utility vehicle conversion 3 is a shock 50 having a first end 51 pivotably connectable to a tension shaft 100 and a second end 52 pivotably connectable to the trailing link 30. Shock 50 is comprised of at least one of coil, leaf or torsion springs; wherein the shocks are mechanical, hydraulic, and/or pneumatic. In some embodiments, shock 50 can be configured to act as a lock-out member.

The walking beam 40 has a plurality of axle mounted bogey wheels 84 for engaging the lugs 86 on the interior of track 80. In some embodiments, pivot point 41 of walking beam 40 is biased toward the front or rear of utility vehicle 2. A drive sprocket 85 mountable to a traction drive 115 of the utility vehicle 2 is configured to engage and provide rotational power to the track 80.

When not already present on utility vehicle 2, the utility vehicle conversion 3 also include an actuator 103 attachable to the chassis 10. The actuator 103 has a shaft 104 with a distal end 105 pivotably connected to the tension shaft 100 and configured to rotate the tension shaft 100. The rotation of tension shaft 100 increases or decreases the tension of tracks 80 and the height of utility vehicle 2 and chassis 10.

Further, some embodiments of utility vehicle conversion 3 also include front wheels 93 having a steerable axle 96, when present on utility vehicle 2. Some embodiments of utility conversion 3 also have a synchronization of the steerable axle 96 with traction drive 115 for the track 80, which emulates Ackerman Steering geometry.

Some embodiments of utility vehicle conversion 3 further comprise an attachment boom assembly 130 that is pivotably attachable to chassis 10. Attachment boom assembly has a boom 138 and an attachment interface 135. Boom 138 has a first end 138a and a second end 138b, the boom first end 138a is pivotably attachable to the chassis 10 and the boom second end 138b is pivotably attachable to an attachment interface 135. Further, some embodiments of attachment boom assembly 138 further comprise one or both of lift cylinder 136 or pitch cylinder 137. The lift cylinder 136 is pivotably mountable between the chassis 10 and the boom 138. The pitch cylinder 137 is pivotably mountable between the boom 138 and the attachment interface 135.

Also disclosed is a method of converting a utility vehicle 2 to a partially tracked utility vehicle 2. For the sake of brevity, this method will be described with respect to the suspension components 20 and chassis 10 on the right side of utility vehicle 2. It is understood that the left side suspension components 20 and chassis 10 of utility vehicle 2 will be a mirror image of the right side described herein. The method includes providing a utility vehicle 2 having a rear drive wheel 94 mounted on traction drive 115 and front wheels 93 mounted on a chassis 10, a trailing link 30, a shock 50, a walking beam 40, a drive sprocket 85, and a track 80. This method includes removing rear drive wheel 94 from traction drive 115. If a mower deck 95 is present on the underside of the utility vehicle 2 and interferes with any suspension components (such as track 80 or trailing link 30), this method further includes removing the mower deck 95. The method also includes pivotably connecting a first end 32 of the trailing link 30 to the chassis 10 and pivotably mounting a second end 33 of the trailing link 30 to the walking beam 40 at walking beam pivot 41. Walking beam 40 further includes a plurality of axle mounted bogey wheels 84 for engaging the lugs 86 on the inner surface of track 80. Some embodiments of the method include, biasing walking beam pivot 41 toward a front or a rear of the utility vehicle 2.

The method also includes pivotably connecting the first end 51 of the shock 50 to a tension shaft 100 pivotably connected to the chassis 10, and pivotably connecting the second end 52 of the shock 50 to the trailing link 30. In some embodiments of the method, shock 50 can be configured as a lock-out member. In some embodiments, shock 50 is comprised of at least one of coil, leaf or torsion springs. Further, in some embodiments, shock 50 is mechanical, hydraulic, and/or pneumatic.

Further included is mounting the drive sprocket 85 to the traction drive 115. Additionally, the method includes, placing the track 80 around the drive sprocket 85 and the walking beam 40, wherein the drive sprocket 85 engages and provides rotational power to the track 80.

Some embodiments of the method further provide an actuator 103 for mounting on chassis 10, if actuator 103 is not already present on utility vehicle 2, and pivotably connecting a distal end 105 of shaft 104 of the actuator 103 to the tension shaft 100. Actuator 103 is configured to rotate the tension shaft 100. The rotation of tension shaft 100 increases or decreases the tension of track 80 and/or increased or decreases the ride height of utility vehicle chassis 10.

In some embodiments of the method, tension shaft 100 is also provided and pivotably connected to chassis 10, if not already present on utility vehicle 2.

In some embodiments, utility vehicle 2 front wheels 93 are casters, in other embodiments, front wheels 93 are steerable with a steerable axle 96. In some embodiments of utility vehicle 2 with front wheels 93 having a steerable axle 96, Ackerman steering geometry is emulated by synchronizing the traction drive 115 of the track 80 with the steerable axle 96.

In some embodiments of the method of converting, an attachment boom assembly 130 is provided having a 138 boom and an attachment interface 135. The attachment boom assembly 130 is then pivotably attached to chassis 10. In some embodiments, attachment boom assembly 130 is pivotably attached to chassis 10 by attaching a first end 138a of the boom 138 to chassis 10. The second end of boom 138b is then pivotably attached to attachment interface 135. In some embodiments, attachment boom assembly 130 has one or both of a lift cylinder 136 or a pitch cylinder 137. When present, lift cylinder 136 is pivotably mounted between the chassis 10 and the boom 138. When present, pitch cylinder 137 is pivotably mounted between the boom 138 and the attachment interface 135.

This proposal includes a Utility Vehicle 2 with a chassis 10, an Occupant Protection System 120, bench or bucket seating 121, a Spark or Compression Ignition engine, hydrostatic (pumps and motors) traction-drive system 115, service and park brake systems, a steering system that controls the speed and direction of the tracks based on steer-angle input, a speed/directional control linkage, a suspension system 20 and ground engaging tracks 80. This proposal can also include a Utility Vehicle 2 stored-energy devices, electric generator/alternators, and electric motors. This proposal can also include a Utility Vehicle 2 with tracks 80 to support and transfer a portion of the loading of the machine through suspension elements to the terrain it traverses. This proposal can also include a Utility Vehicle 2 with suspension elements 20 including mechanical (coil, leaf, torsion, etc.) springs 50 and hydraulic or pneumatic spring devices 50. This proposal can also include a Utility Vehicle 2 suspension elements 20 including mechanical (coil, leaf, torsion, etc.) springs 50 and hydraulic or pneumatic spring devices 50 that are manually or power adjustable. This proposal can also include a Utility Vehicle 2 with manually or power adjustable suspension elements 20. This proposal can also include a Utility Vehicle 2 with trailing-links 30 to transfer vertical and lateral loading (mass and payload) of the machine chassis 10 to the walking-beams 40. This proposal can also include a Utility Vehicle 2 with walking-beams 40 with the walking beam pivots 41 biased toward one end or the other that transfer the vertical and lateral loading of the machine from the trailing-links 30 to the bogie wheels 84.

This proposal can also include a Utility Vehicle 2 with bogie-wheels 84 that transfer the vertical and lateral load reactions of the machine that occur during normal operations, turning maneuvers and side hill operations, from the walking-beams 40 to the tracks 80. This proposal can also include a Utility Vehicle 2 with tracks 80 having drive and guide lugs 86 that transfer the vertical, lateral and longitudinal loading of the machine from the bogie-wheels 84 and drive sprockets 85 to the terrain, and this includes the lateral reactions that occur during turning maneuvers and the traction forces generated by the drive sprockets 85. This proposal can also include a Utility Vehicle 2 with an adjustable spring-loaded system that maintains track tension. This proposal can also include a Utility Vehicle 2 with increased ground contact area (fore-and-aft) with lower ground pressure.

While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention. Combinations of the above embodiments and other embodiments will be apparent to those of skill in the art upon studying the above description and are intended to be embraced therein. Therefore, the scope of the present invention is defined by the appended claims, and all devices, processes, and methods that come within the meaning of the claims, either literally or by equivalence, are intended to be embraced therein.

What is claimed is:

1. A partially tracked utility vehicle having a chassis comprising:
    front wheels;
    a trailing link suspension comprising:
        a trailing link having a first end pivotably connected to said chassis and a second end pivotably connected to a walking beam at a walking beam pivot;
        a shock having a first end pivotably connected to a tension shaft and a second end pivotably connected to said trailing link;
        said walking beam further comprising a plurality of axle mounted bogey wheels for engaging a track of said partially tracked utility vehicle;
        a sprocket mounted to a traction drive of said partially tracked utility vehicle for engaging and providing rotational power to said track; and
        an actuator attached to said chassis, said actuator having a shaft pivotably connected to said tension shaft and configured to rotate said tension shaft.

2. The partially tracked utility vehicle as recited in claim 1 further comprising front wheels having a steerable axle.

3. The partially tracked utility vehicle as recited in claim 2, wherein said steerable axle is synchronized with said traction drive of said track to emulate Ackerman Steering geometry.

4. The partially tracked utility vehicle as recited in claim 1, wherein the rotation of said tension shaft increases or decreases the tension of said track.

5. The partially tracked utility vehicle as recited in claim 1, wherein the rotation of said tension shaft increases or decreases a height of said partially tracked utility vehicle.

6. The partially tracked utility vehicle as recited in claim 1, wherein said shock is configured to act as a lock-out member.

7. The partially tracked utility vehicle as recited in claim 1, wherein said walking beam pivot of said walking beam is biased toward a front or a rear of said partially tracked utility vehicle.

8. The partially tracked utility vehicle as recited in claim 1, wherein said shock is comprised of at least one of a coil, a leaf or a torsion spring; wherein said shock is mechanical, hydraulic, and/or pneumatic.

9. The partially tracked utility vehicle as recited in claim 1, said partially tracked utility vehicle further comprising an attachment boom assembly having a boom and an attachment interface, said attachment boom assembly being pivotably attached to said chassis.

10. The attachment boom assembly of claim 9 wherein said boom has a first end and a second end, said boom first end is pivotably attached to said chassis and said boom second end is pivotably attached to an attachment.

11. The attachment boom assembly as in claim 9, further comprising at least one of a lift cylinder or a pitch cylinder; said lift cylinder being pivotably mounted between said chassis and said boom, said pitch cylinder being pivotably mounted between said boom and said attachment interface.

12. The partially tracked utility vehicle as in claim 1, wherein said partially tracked utility vehicle is a utility machine.

13. The partially tracked utility vehicle of claim 12, wherein said utility machine is a zero turn mower or a zero turn tractor.

14. The partially tracked utility vehicle of claim 1, wherein said track has a front and a rear, wherein said walking beam is located at said front of said track and said sprocket is located at said rear of said track.

15. The partially tracked utility vehicle of claim 1, wherein said second end of said shock is pivotably connected to said trailing link in an area located between a middle of said trailing link and said second end of said trailing link.

16. The partially tracked utility vehicle of claim 1, wherein said first end of said trailing link is directly pivotably connected to said chassis and said second end of said trailing link is directly pivotably connected to said walking beam.

\* \* \* \* \*